US011869396B2

(12) United States Patent
Lee

(10) Patent No.: US 11,869,396 B2
(45) Date of Patent: Jan. 9, 2024

(54) DISPLAY DEVICE AND OPERATING METHOD THEREFOR

(71) Applicant: SAMSUNG DISPLAY CO., LTD., Yongin-si (KR)

(72) Inventor: Yo Han Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/757,689

(22) PCT Filed: Nov. 27, 2020

(86) PCT No.: PCT/KR2020/017176
§ 371 (c)(1),
(2) Date: Jun. 17, 2022

(87) PCT Pub. No.: WO2021/125614
PCT Pub. Date: Jun. 24, 2021

(65) Prior Publication Data

US 2023/0014815 A1 Jan. 19, 2023

(30) Foreign Application Priority Data

Dec. 17, 2019 (KR) ........................ 10-2019-0169047

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2320/0233* (2013.01)

(58) Field of Classification Search
CPC .. G09G 3/32; G09G 3/006; G09G 2300/0819; G09G 2300/0842;
(Continued)

(56) References Cited

U.S. PATENT DOCUMENTS 8,207,914 B2 6/2012 Cok et al.
10,658,605 B2 5/2020 Lee et al.
(Continued)

FOREIGN PATENT DOCUMENTS

JP 2014-123583 A 7/2014
KR 10-1310935 B1 9/2013
(Continued)

OTHER PUBLICATIONS

International Search Report of PCT/KR2020/017176, dated Mar. 2, 2021, 4 pages.

*Primary Examiner* — Muhammad N Edun
(74) *Attorney, Agent, or Firm* — Lewis Roca Rothgerber Christie LLP

(57) ABSTRACT

The present disclosure relates a display device and a method of driving the same. For example, a display device according to one or more embodiments of the present disclosure includes pixels, a sensing unit, and a compensator calculating a current compensation value for each of the pixels based on a sensing value of the sensing unit, a first pixel among the pixels includes at least two light emitting diodes connected in series with a first transistor that controls a current, the sensing unit outputs a sensing value by sensing a voltage of the light emitting diodes in a sensing period, and the compensator increases the current compensation value for the first pixel as a voltage of the second node decreases in the sensing period.

17 Claims, 17 Drawing Sheets

(58) Field of Classification Search

CPC ....... G09G 2320/0233; G09G 2360/16; G09G 2330/10; G09G 2320/0204; G09G 2320/0295; G09G 2320/0693; G09G 2320/0285; G09G 2320/029

See application file for complete search history.

(56) References Cited

U.S. PATENT DOCUMENTS

| | | | | |
|---|---|---|---|---|
| 2015/0348504 | A1* | 12/2015 | Sakariya | G09G 3/2092 345/82 |
| 2016/0351096 | A1* | 12/2016 | Tani | G09G 3/3233 |
| 2018/0033373 | A1 | 2/2018 | Hong et al. | |
| 2019/0189038 | A1* | 6/2019 | Park | G09G 3/3225 |

FOREIGN PATENT DOCUMENTS

| | | | |
|---|---|---|---|
| KR | 10-2015-0079247 | A | 7/2015 |
| KR | 10-2017-0064163 | A | 6/2017 |
| KR | 10-2017-0076952 | A | 7/2017 |
| KR | 10-2018-0026028 | A | 3/2018 |
| KR | 10-2019-0029831 | A | 3/2019 |
| KR | 10-2019-0048887 | A | 5/2019 |

* cited by examiner

DISPLAY DEVICE AND OPERATING METHOD THEREFOR

CROSS-REFERENCE TO RELATED APPLICATIONS

This application is a U.S. National Phase Patent Application of International Patent Application Number PCT/KR2020/017176, filed on Nov. 27, 2020, which claims priority to Korean Patent Application Number 10-2019-0169047, filed on Dec. 17, 2019, the entire content of all of which is incorporated herein by reference.

TECHNICAL FIELD

The present disclosure relates to a display device and a method of driving the same.

BACKGROUND ART

As an information technology is developed, importance of a display device that is a connection medium between a user and information is emphasized. In response to this, a use of a display device such as a liquid crystal display device, an organic light emitting display device, and a plasma display device is increasing.

The display device may include a plurality of pixels, and as a light emitting diode included in the plurality of pixels emits light with various colors and luminance, the display device may display various images.

The plurality of pixels may include pixel circuits of the substantially the same structure. However, as the display device increases in size, a process deviation may occur according to a position of the pixels. Therefore, even transistors performing the same function in each of the pixels may have different characteristics such as mobility and a threshold voltage. Similarly, threshold voltages of the light emitting diodes of each of the pixels may be different from each other. In such a process, a technique for sensing characteristic information (mobility, threshold voltage, and the like) of elements included in the pixels and compensating for the characteristic information changed according to deterioration is being developed.

Meanwhile, recently, as the light emitting diode may be implemented in a nano size to a micro size, a plurality of light emitting diodes may be included in the pixel and emit light with a high luminance. A display device including such light emitting diodes may display a clearer image.

However, when a defective light emitting diode exists in the pixel due to a short or the like among such light emitting diodes, there are problems that the corresponding pixel may not emit light with a suitable luminance and a luminance deviation between a plurality of pixels may occur.

Therefore, a technique for compensating for a driving current so that a corresponding pixel continues to emit light with an appropriate luminance even though the light emitting diode is short is being requested.

DETAILED DESCRIPTION OF INVENTION

Technical Problem

An aspect to be solved by the present disclosure is to provide a display device and a method of driving the same, which reduce or minimize a luminance deviation between pixels by allowing a corresponding pixel to emit light with an appropriate luminance even though a light emitting diode is shorted.

The aspects of the present disclosure are not limited to the aspect described above, and other aspects which are not described will be clearly understood by those skilled in the art from the following description.

Technical Solution

In order to solve the above-described aspect, a display device according to one or more embodiments of the present disclosure includes pixels, a sensing unit connected to the pixels through sensing lines, and a compensator configured to calculate a current compensation value for each of the pixels based on a sensing value of the sensing unit, a first pixel among the pixels includes a first transistor including a gate electrode connected to a first node, a first electrode connected to first power, and a second electrode connected to a second node, a first light emitting diode including an anode connected to the second node, and a cathode, and a second light emitting diode including an anode connected to the cathode of the first light emitting diode in series, and a cathode connected to second power, the sensing unit outputs the sensing value by sensing a voltage of the second node in a sensing period, and the compensator increases the current compensation value for the first pixel as the voltage of the second node decreases in the sensing period.

Here, the first pixel may further include a second transistor including a gate electrode connected to a first scan line, a first electrode connected to a data line, and a second electrode connected to the first node, and a third transistor including a gate electrode connected to a second scan line, a first electrode connected to the second node, and a second electrode connected to the sensing line.

Here, a scan signal of a turn-on level may be supplied to the first scan line during a display period, a scan signal of a turn-off level may be supplied to the second scan line during the display period, and a data voltage may be supplied to the data line during the display period.

Here, a scan signal of a turn-on level may be supplied to the first scan line during the sensing period, the scan signal of the turn-on level may be supplied to the second scan line during the sensing period, and a sensing data voltage may be supplied to the data line during the sensing period.

Here, a scan signal of a turn-on level may be supplied to the first scan line during the sensing period, the scan signal of the turn-on level may be supplied to the second scan line during the sensing period, a sensing data voltage may be supplied to the data line during the sensing period, and a voltage of the second power may be maintained in a state in which the voltage of the second power is increased from a first level to a second level.

Here, the sensing unit may include a first sensing transistor including a gate electrode connected to a first control line, a first electrode connected to the sensing line, and a second electrode connected to a third node, a second sensing transistor including a gate electrode connected to a second control line, a first electrode connected to reference power, and a second electrode connected to the third node, a third sensing transistor including a gate electrode connected to the second control line, a first electrode connected to the sensing line, and a second electrode connected to a fourth node, a first resistor including a first terminal connected to the fourth node and a second terminal connected to a fifth node, a fourth sensing transistor including a gate electrode connected to the first control line, a first electrode connected to the reference power, and a second electrode connected to the fourth node, a second resistor including a first terminal connected to the fifth node and a second terminal connected to a sixth node, an amplifier including a first input terminal connected to the third node, a second input terminal connected to the sixth node, and an output terminal, and a third resistor including a first terminal connected to the sixth node and a second terminal connected to the output terminal.

Here, a control signal of a turn-on level may be supplied to the first control line during the sensing period, and a control signal of a turn-off level may be supplied to the second control line during the sensing period.

Here, the amplifier may output a first output voltage based on a voltage of the third node and a voltage of the reference power.

Here, the compensator may calculate a change amount of the voltage of the second node based on a first output voltage value of the first output voltage and a preset reference voltage value, and increase the current compensation value as the change amount increases.

Here, the compensator may calculate a decrease ratio that is a ratio of the sensing value of the voltage of the second node to the reference voltage value, extract compensation amount data corresponding to decrease ratio data from a pre-stored lookup table, and may calculate the current compensation value from the extracted compensation amount data.

Here, the compensator may calculate as the current compensation value based on a ratio of the reference voltage value to the sensing value of the voltage of the second node.

Here, a control signal of a turn-off level may be supplied to the first control line during a sensing period, and a control signal of a turn-on level may be supplied to the second control line during the sensing period.

Here, the amplifier may output a second output voltage based on a voltage of the fifth node and the voltage of the reference power.

Here, the compensator may calculate a change amount of a sensing current based on a second output voltage value of the second output voltage and a preset reference current value, and may calculate the current compensation value based on the change amount.

Here, the sensing unit may output a first sensing value by sensing the voltage of the second node during a first sensing period, and may output a second sensing value by sensing a sensing current during a second sensing period that does not overlap the first sensing period.

In another aspect, a method of driving a display device according to one or more embodiments of the present disclosure includes a voltage sensing operation of sensing a voltage applied to a plurality of light emitting diodes included in a pixel, a defective light emitting diode detection operation of detecting whether a shorted defective light emitting diode exists in the pixel based on the voltage and a preset reference voltage, and a current compensation value calculation operation of calculating a current compensation value for the pixel and increasing the current compensation value as the voltage decreases, when the defective light emitting diode is detected.

Here, the pixel may include a first transistor including a gate electrode connected to a first node, a first electrode connected to first power, and a second electrode connected to a second node, a first light emitting diode including an anode connected to the second node, and a cathode, and a second light emitting diode including an anode connected to the cathode of the first light emitting diode in series, and a cathode connected to second power, and the voltage sensing operation may sense a voltage of the second node.

Here, the defective light emitting diode detection operation may determine that the defective light emitting diode exists when the voltage of the second node is less than the reference voltage.

Here, the current compensation value calculation operation may calculate a change amount of the voltage of the second node based on the voltage of the second node and the reference voltage, and increase the current compensation value as the change amount increases.

The details of other embodiments are included in the detailed description and drawings.

Advantageous Effects

As described above, embodiments of the present disclosure may provide a display device and a method of driving the same, which reduce or minimize a luminance deviation between pixels by allowing a corresponding pixel to emit light with an appropriate luminance even when a light emitting diode is shorted.

An aspect according to embodiments is not limited by the contents exemplified above, and more various aspects are included in the present specification.

MODE FOR INVENTION

Figure 1:
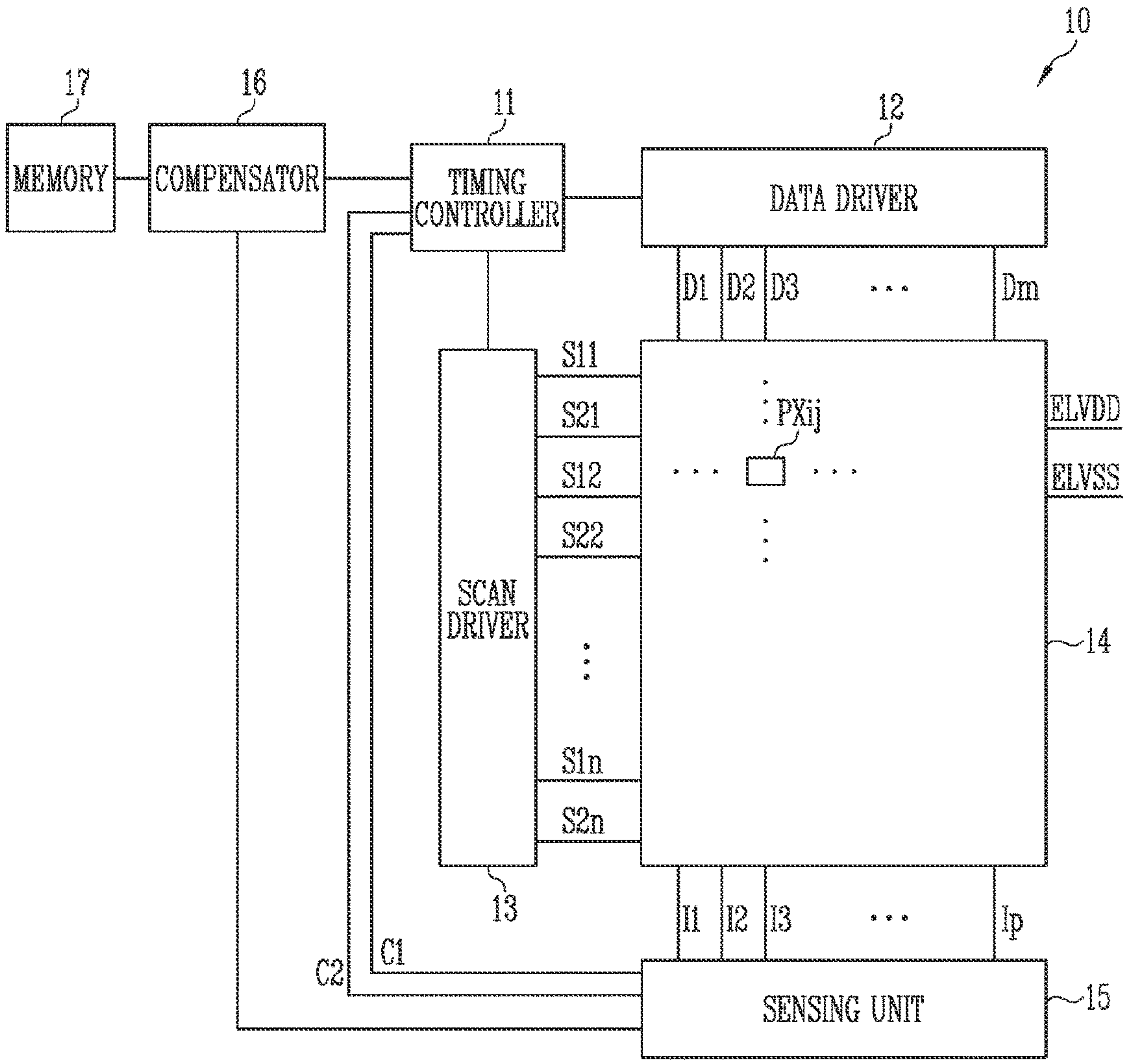
FIG. 1 is a block diagram schematically illustrating a display device according to one or more embodiments of the present disclosure.

The aspects of the disclosure and a method of achieving them will become apparent with reference to the embodiments described in detail below together with the accompanying drawings. However, the disclosure is not limited to the embodiments disclosed below, may be implemented in various different forms, the embodiments of the present disclosure are provided so that the disclosure will be thorough and complete and those skilled in the art to which the disclosure pertains can fully understand the scope of the disclosure, and the present disclosure is only defined by the scope of the claims.

Although a first, a second, and the like are used to describe various components, these components are not limited by these terms. These terms are used only to distinguish one component from another component. Therefore, a first component mentioned below may be a second component within the technical spirit of the disclosure. Singular expressions include plural expressions unless the context clearly indicates otherwise.

The following embodiments may be applied to various display devices such as an organic light emitting display device, a liquid crystal display device, a field emission display device, and an electrophoretic device.

Hereinafter, embodiments of the present disclosure are described in detail with reference to the accompanying drawings. The same or similar reference numerals are used for the same components in the drawings.

FIG. 1 is a block diagram schematically illustrating a display device 10 according to one or more embodiments of the present disclosure.

Referring to FIG. 1, the display device 10 according to one or more embodiments of the present disclosure may include a timing controller 11, a data driver 12, a scan driver 13, a display unit 14, a sensing unit 15, a compensator 16, a memory 17, and the like.

The timing controller 11 may receive various grayscale values (or grayscale data) and control signals for each image frame from an external processor (not shown). The timing controller 11 may render the grayscale values to correspond to a specification of the display device 10. For example, the external processor may provide a red grayscale value, a green grayscale value, and a blue grayscale value with respect to each unit dot. However, for example, when the display unit 14 has a PENTILE™ structure (e.g., an RGBG structure, PENTILE™ being a registered trademark of Samsung Display Co., Ltd., Republic of Korea), because adjacent unit dots share a pixel, the pixel may not correspond to each grayscale value one-to-one, and rendering of the grayscale values is suitable. When each pixel corresponds to each grayscale value one-to-one, rendering of the grayscale values may be unnecessary. The rendered or non-rendered grayscale values may be provided to the data driver 12. Meanwhile, the timing controller 11 may provide control signals suitable for respective specifications to the data driver 12 and the scan driver 13 for frame display. Meanwhile, the timing controller 11 may provide control signals suitable for a specification to the sensing unit 15 through a first control line C1 and a second control line C2 to instruct a sensing operation.

The data driver 12 may generate data voltages to be provided to data lines D1, D2, D3, and Dm by using the grayscale values and the control signals. For example, the data driver 12 may sample the grayscale values using a clock signal, and may apply the data voltages corresponding to the grayscale values to the data lines D1 to Dm in a pixel row unit. m may be an integer greater than 0.

The scan driver 13 may receive a clock signal, a scan start signal, and the like from the timing controller 11 and may generate first scan signals to be provided to first scan lines S11, S12, and S**1*n* and second scan signals to be provided to second scan lines S21, S22, and S2*n***. n may be an integer greater than 0.

The scan driver 13 may sequentially supply first scan signals having a pulse of a turn-on level to the first scan lines S11, S12, and S**1*n*. In addition, the scan driver 13 may sequentially supply second scan signals having a pulse of a turn-on level to the second scan lines S21, S22, and S2*n***.

In some embodiments, the scan driver 13 may include a first scan driver connected to the first scan lines S11, S12, and S**1*n* and a second scan driver connected to the second scan lines S21, S22, and S2*n***. Each of the first scan driver and the second scan driver may include scan stages configured in a form of a shift register. Each of the first scan driver and the second scan driver may generate scan signals in a method of sequentially transferring the scan start signal of a pulse form of a turn-on level to a next scan stage according to control of the clock signal.

According to one or more embodiments, the first scan signals and the second scan signals may be the same. In this case, the first scan line and the second scan line connected to each pixel PXij may be connected to the same node. In this case, the scan driver 13 need not be divided into the first scan driver and the second scan driver, and may be configured as a single scan driver.

The display unit 14 may include pixels PXij. Each of the pixels PXij may be connected to corresponding data line, scan line, and sensing line. This is described later with reference to FIG. 2.

The sensing unit 15 may receive a control signal from the timing controller 11 and may receive a sensing signal through each of sensing lines l1, l2, l3, and lp. For example, the sensing unit 15 may receive the sensing signal through the sensing lines l1, l2, l3, and lp for at least a partial period of a sensing period. p may be an integer greater than 0, and may be the same as m described above. The sensing unit 15 may be connected to the pixels PXij through the sensing lines l1, l2, l3, and lp.

In some embodiments, the sensing unit 15 may include sensing channels connected to the sensing lines l1, l2, l3, and lp. For example, the sensing lines l1, l2, l3, and lp and the sensing channels may correspond one-to-one.

Meanwhile, as in the present embodiments, the data driver 12 and the sensing unit 15 may be separately configured. However, in one or more other embodiments, the data driver 12 and the sensing unit 15 may be integrally configured.

The sensing unit 15 may sense a sensing current or a sensing voltage and may output a sensing value therefor. Here, the sensing value (or sensing data) may be a digital value and may mean a sensing current value for the sensing current, and may mean a sensing voltage value for the sensing voltage. Meanwhile, the sensing voltage may mean a voltage of a corresponding node connected to a light emitting diode as will be described later with reference to FIGS. 5 to 9.

As one or more embodiments, the sensing unit 15 may measure a sensing voltage according to a sensing current flowing through each of the pixels PXij and may output a first sensing value. For example, the timing controller 11 supplies a control signal of a turn-on level through the first control line C1 and supplies a control signal of a turn-off level through the second control line C2. In addition, the sensing unit 15 may sense the sensing voltage generated from at least one light emitting diode included in each of the pixels PXij during a first sensing period according to the control signal supplied from the timing controller 11, and may output the first sensing value that is a sensing voltage value.

As one or more other embodiments, the sensing unit 15 may measure the sensing current for each pixel PXij and may output a second sensing value. For example, the timing controller 11 supplies the control signal of the turn-off level through the first control line C1 and the control signal of the turn-on level through the second control line C2. In addition, the sensing unit 15 may sense the sensing current of only some of the pixels PXij or may sense the sensing current of all of the pixels PXij during a second sensing period according to the control signal supplied from the timing controller 11, and may output the second sensing value (or second sensing values) that is a sensing current value.

Here, the first sensing period and the second sensing period might not overlap. In addition, the first sensing time and the second sensing period may be sequentially arranged periods, and for example, the first sensing period may be a period preceding the second sensing period, and the first sensing period may be a period that comes after the second sensing period.

The compensator 16 may calculate a current compensation value for each of the pixels based on the sensing value of the sensing unit 15. For example, the compensator 16 may calculate the current compensation value based on the second sensing value output from the sensing unit 15 and a preset reference current value, and may generate an output grayscale value by reflecting the current compensation value to an input grayscale value input from an outside. As another example, the compensator 16 may calculate the current compensation value based on the first sensing value output from the sensing unit 15 and the preset reference voltage value, and may generate the output grayscale value by reflecting the current compensation value to the input grayscale value input from the outside.

Here, the reference current value (or reference current data) may be a digital value of the current flowing through the pixel PXij and may mean a current value expected when reference grayscale data is input from the outside, and the reference voltage value (or reference voltage data) may be a digital value of a voltage generated by the light emitting diode included in the pixel PXij and may mean a voltage value expected when the reference grayscale data is input. The reference current value and the reference voltage value may be stored in the memory 17 in advance before shipment, and may be actively redefined in a process of using a product.

Meanwhile, the input grayscale value may be grayscale data input from the external processor and may mean grayscale data for the image frame. In addition, the output grayscale value may mean grayscale data input to the data driver 12 after the input grayscale value is compensated by the compensator 16.

The compensator 16 may include a lookup table (not shown). The lookup table may exist in a data form and may also exist in a physical form. Before shipment of the display device 10 of FIG. 1, the lookup table may store compensation amount data corresponding to the sensing value or a change amount of the sensing value in advance. A detailed description thereof is described later. Meanwhile, the lookup table may be included outside the compensator 16, for example, in the memory 17. In one or more other embodiments, the lookup table may also update the compensation amount data corresponding to the sensing value or the change amount of the sensing value after the shipment of the display device 10 of FIG. 1.

The memory 17 may store a reference current value, a reference voltage value, and the like, and may store the above-described lookup table. The memory 17 may internally communicate with the compensator 16 to provide the reference current value, the reference voltage value, the compensation amount data of the lookup table, and the like to the compensator 16.

Hereinafter, the pixel PXij according to one or more embodiments of the present disclosure is described, and for convenience, the pixel PXij shown in FIG. 1 is referred to as a first pixel PXij defined by an i-th first scan line S1*i*, an i-th second scan line S2*i*, and a j-th data line Dj.

Figure 2:
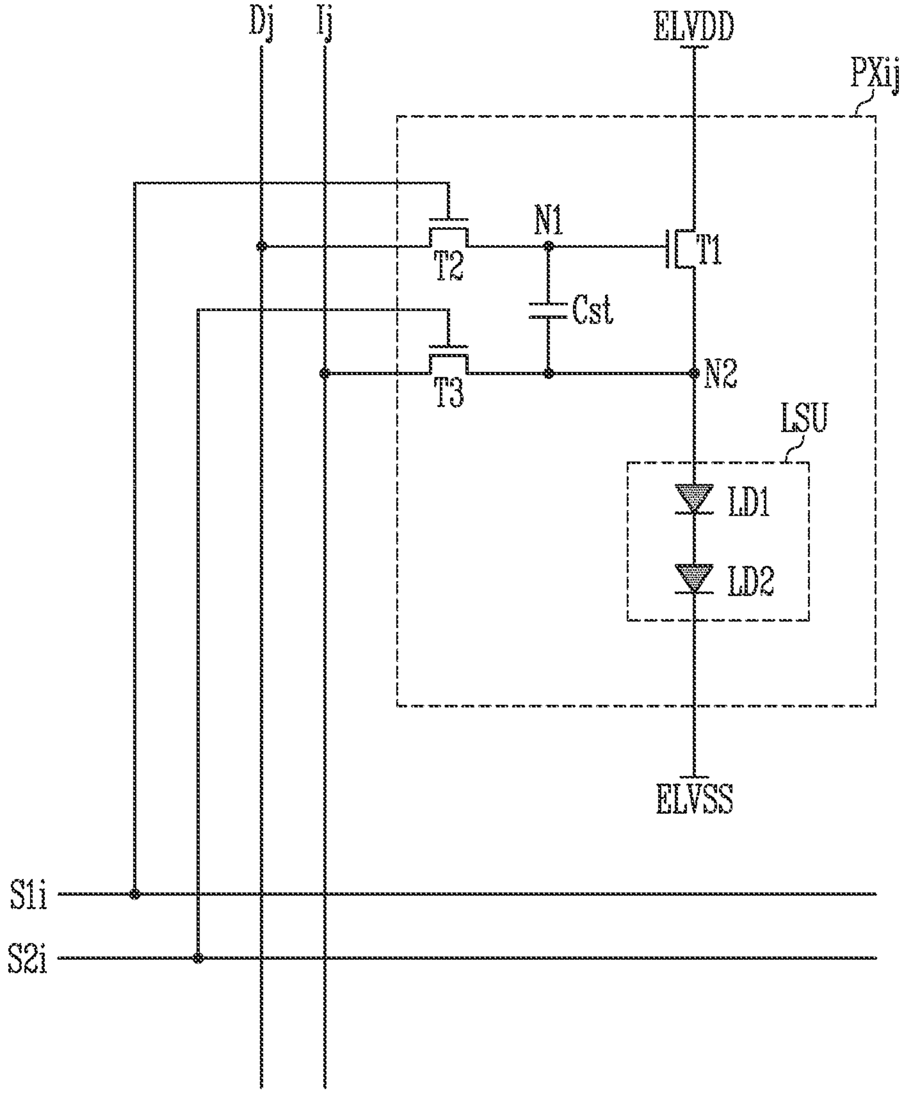
FIG. 2 is an equivalent circuit diagram illustrating one or more embodiments of a first pixel included in the display device of FIG. 1.
Figure 3:
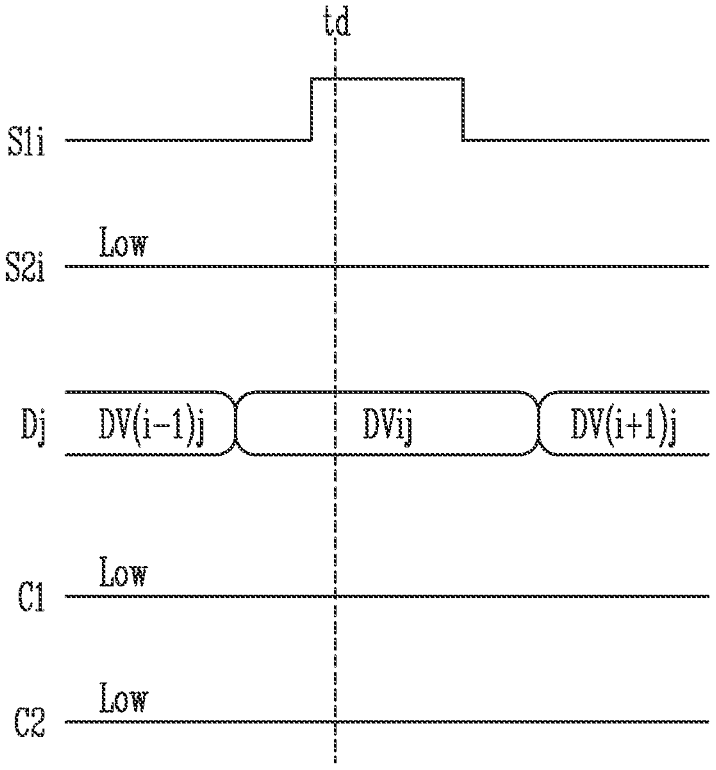
FIG. 3 is a timing diagram illustrating an operation in which the first pixel of FIG. 2 emits light in a display period.
Figure 4:
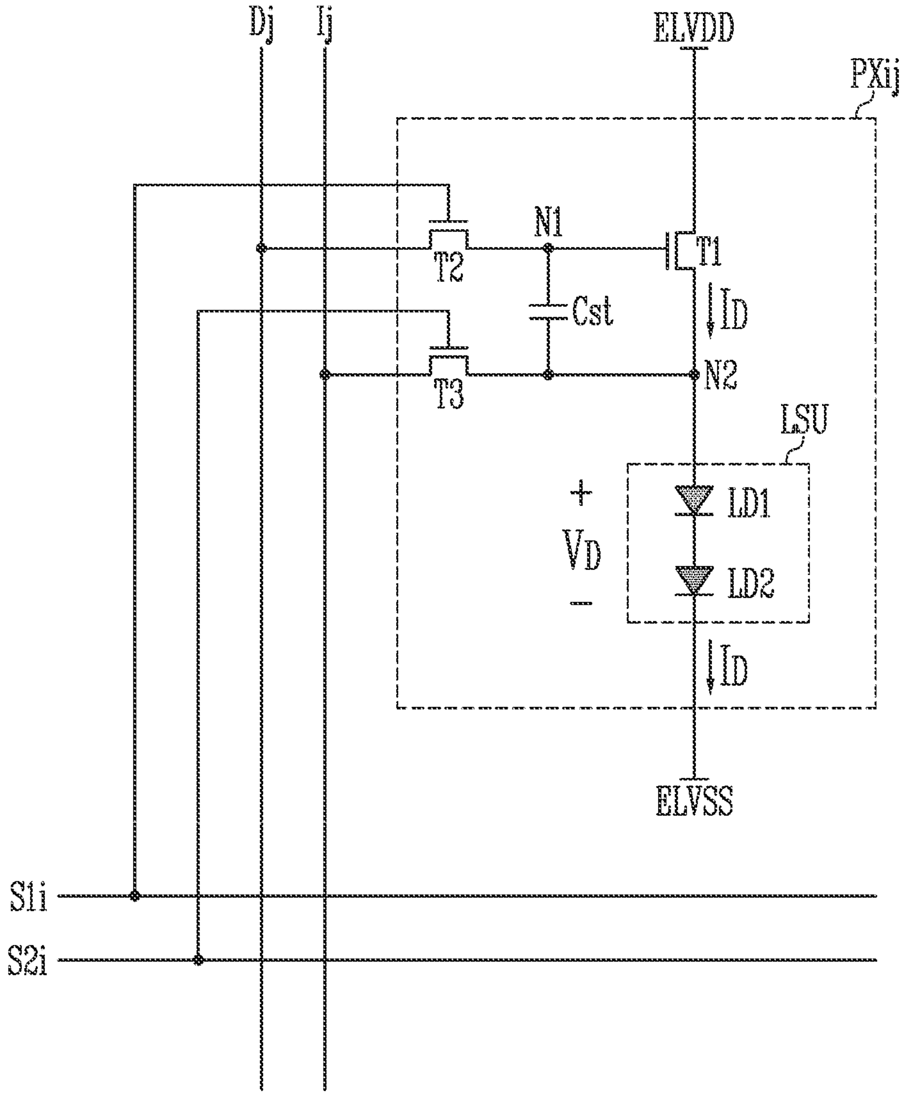
FIG. 4 is an equivalent circuit diagram illustrating an operation in which the first pixel of FIG. 2 emits light in the display period.

FIG. 2 is an equivalent circuit diagram illustrating one or more embodiments of the first pixel PXij included in the display device 10 of FIG. 1, FIG. 3 is a timing diagram illustrating an operation in which the first pixel PXij of FIG. 2 emits light in a display period, and FIG. 4 is an equivalent circuit diagram illustrating an operation in which the first pixel PXij of FIG. 2 emits light in the display period.

Referring to FIG. 2, the first pixel PXij included in the display device 10 according to one or more embodiments of the present disclosure may include a first transistor T1, a second transistor T2, a third transistor T3, a storage capacitor Cst, and a light source unit LSU.

The transistors T1, T2, and T3 may be configured as N-type transistors. In one or more other embodiments, the transistors T1, T2, and T3 may be configured as P-type transistors. In one or more other embodiments, the transistors T1, T2, and T3 may be configured as a combination of an N-type transistor(s) and a P-type transistor(s). The N-type transistor collectively refers to a transistor in which an amount of conducting current increases when a voltage difference between a gate electrode and a source electrode increases in a positive direction. The P-type transistor collectively refers to a transistor in which an amount of conducting current increases when a voltage difference between a gate electrode and a source electrode increases in a negative direction. Such a transistor may be configured in various forms such as a thin film transistor (TFT), a field effect transistor (FET), and a bipolar junction transistor (BJT).

The first transistor T1 may include a gate electrode connected to a first node N1, a first electrode connected to first power ELVDD, and a second electrode connected to a second node N2. The first transistor T1 may be referred to as a driving transistor.

The second transistor T2 may include a gate electrode connected to a first scan line (for example, the i-th first scan line S1*i*, hereinafter the same), a first electrode connected to a data line (for example, the j-th data line Dj, hereinafter the same), and a second electrode connected to the first node N1. The second transistor T2 may be referred to as a scanning transistor.

The third transistor T3 may include a gate electrode connected to a second scan line (for example, the i-th second scan line S2*i*, hereinafter the same), a first electrode connected to the second node N2, and a second electrode connected to a sensing line (for example, a j-th sensing line lj, hereinafter the same).

The storage capacitor Cst may include a first electrode connected to the first node N1 and a second electrode connected to the second node N2.

The light source unit LSU may include a plurality of light emitting diodes LD1 and LD2 electrically connected between the first power ELVDD and second power ELVSS. Each of the light emitting diodes may have a size of a range from a nano scale to a micro scale. However, the present disclosure is not limited thereto. In one or more embodiments, the light emitting diodes LD1 and LD2 may be connected to each other in a series structure. For example, the light source unit LSU may include a first light emitting diode LD1 including an anode connected to the second node N2, and a cathode, and a second light emitting diode LD2 including an anode connected in series with the cathode of the first light emitting diode LD1, and a cathode connected to the second power ELVSS. However, the present disclosure is not limited thereto, and as will be described later with reference to FIGS. 13 to 16, the plurality of light emitting diodes included in the light source unit LSU may be connected in a combination of a series structure and a parallel structure.

Referring to FIG. 3, during the display period, data voltages DV(i−1)j, DVij, and DV(i+1)j may be sequentially applied to the data line Dj in a horizontal period unit. In addition, a scan signal of a turn-on level (high level) may be applied to the first scan line S1*i* in a corresponding horizontal period, and a scan signal of a turn-off level (low level) may be applied to the second scan line S2*i* in synchronization with the first scan line S1*i*. In one or more other embodiments, a scan signal of a turn-off level may be always applied to the second scan line S2*i* during the display period. Meanwhile, a control signal of a turn-off level may be applied to the first control line C1 and the second control line C2.

Referring to FIGS. 3 and 4, for example, during the display period, the scan signal of the turn-on level is supplied to the first scan line S1*i*, and the scan signal of the turn-off level is supplied to the second scan line S2*i*, the second transistor T2 may be turned on and the third transistor T3 may be turned off. In addition, the data voltage DVij may be supplied to the data line Dj at an arbitrary time point (for example, at time point td) during which the turn-on state of the second transistor T2 is maintained. Therefore, a voltage corresponding to a difference between the data voltage DVij and a voltage of the second node N2 is written to the storage capacitor Cst of the first pixel PXij. Meanwhile, during the display period, because the control signals of the turn-off level are supplied to the first control line C1 and the second control line C2, the sensing operation of the sensing unit 15 may be stopped.

Referring to FIG. 4, in the first pixel PXij, according to a voltage difference between the gate electrode and a source electrode (for example, the second electrode) of the first transistor T1, a driving current $I_D$ amount flowing through a driving path between/including the first power ELVDD, the first transistor T1, and the second power ELVSS may be determined, and a driving voltage VD may be generated in the light source unit LSU according to the flow of the driving current $I_D$. Accordingly, a luminance of the light source unit LSU (for example, the light emitting diodes LD1 and LD2) may be determined according to the driving current $I_D$ amount.

Subsequently, referring to FIGS. 3 and 4, thereafter, when the scan signal of the turn-off level is applied to the first scan line S1*i* and the second scan line S2*i*, the second transistor T2 and the third transistor T3 may be turned off. Therefore, regardless of a voltage change of the data line Dj, the voltage difference between the gate electrode and the source electrode of the first transistor T1 may be maintained by the storage capacitor Cst, and the luminance of the light source unit LSU (for example, the light emitting diodes LD1 and LD2) may be maintained.

Figure 5:
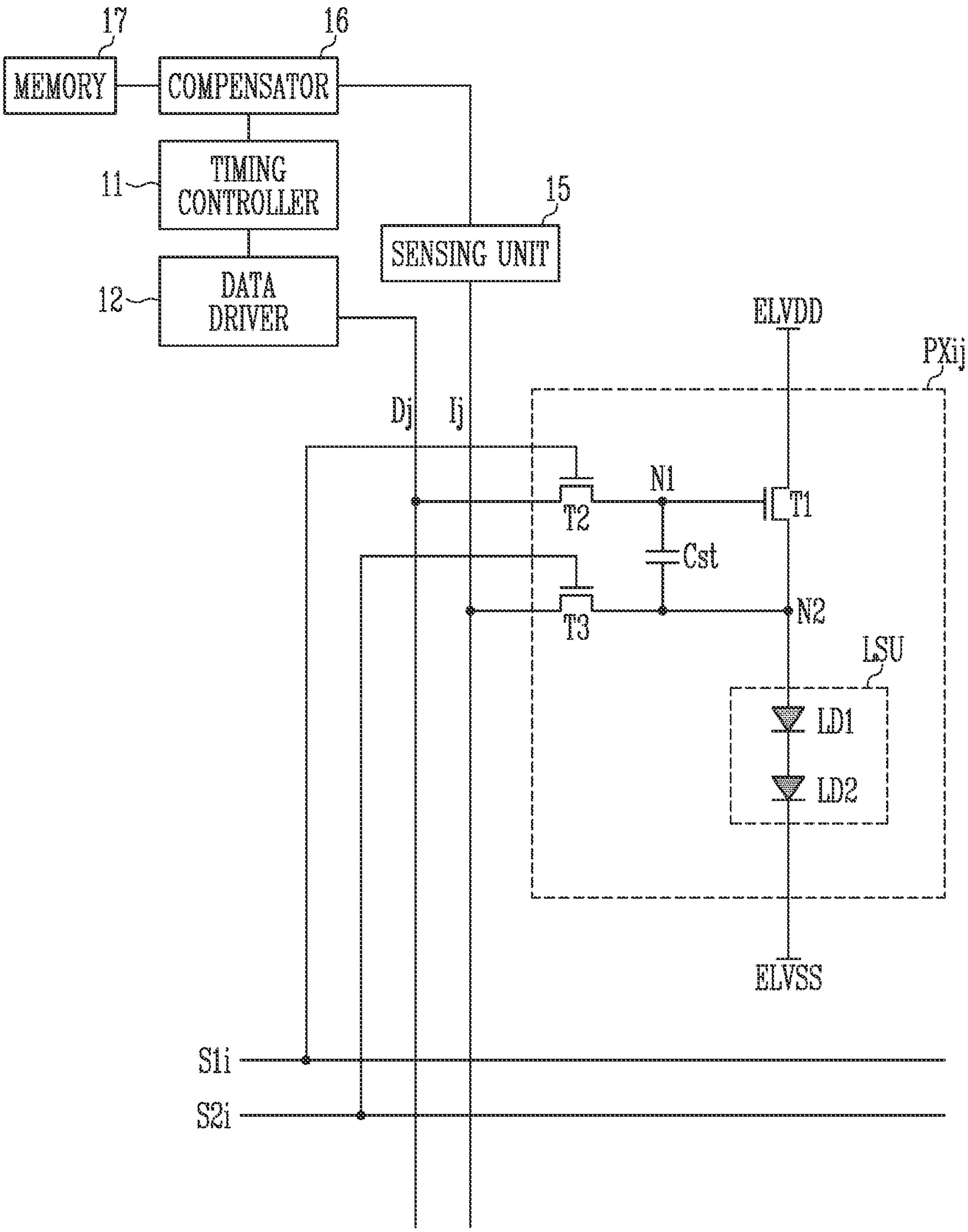
FIG. 5 is a diagram illustrating the first pixel, a sensing unit, a compensator, and a memory included in the display device of FIG. 1.

FIG. 5 is a diagram illustrating the first pixel PXij, the sensing unit 15, the compensator 16, and the memory 17 included in the display device 10 of FIG. 1.

Referring to FIG. 5, the first pixel PXij may include the first transistor T1, the second transistor T2, the third transistor T3, the storage capacitor Cst, and the light source LSU as described above with reference to FIG. 2, and a repeated description thereof is omitted.

The sensing unit 15 may be connected to the first pixel PXij through the sensing line lj. For example, the sensing unit 15 may be connected to the second electrode of the third transistor T3 included in the first pixel PXij through the sensing line lj.

Meanwhile, in order to detect whether the driving voltage VD generated by the light source unit LSU during light emission is in a normal state corresponding to a suitable luminance, the sensing unit 15 may output the sensing value by sensing the voltage of the second node N2 in the first sensing period. For example, in order to detect whether the driving voltage VD generated in the first light emitting diode LD1 and the second light emitting diode LD2 is normal, the sensing unit 15 may sense the voltage of the second node N2 during the first sensing period, and may output a voltage value of the voltage of the second node N2 as the first sensing value.

Meanwhile, in order to detect whether the driving current $I_D$ flowing to the light source unit LSU is in the steady state corresponding to the suitable luminance, the sensing unit 15 may output the sensing value by sensing a current flowing to the second node N2 in the second sensing period. For example, in order to detect whether the driving current $I_D$ flowing through the first light emitting diode LD1 and the second light emitting diode LD2 is normal, the sensing unit 15 may sense a sensing current that is the current flowing through the second node N2 during the second sensing period that does not overlap the first sensing period, and may output a current value of the sensing current as a second sensing value.

As one or more embodiments, the compensator 16 may receive the first sensing value during the first sensing period and may calculate the current compensation value for the first pixel PXij based on the first sensing value. In this case, because the first sensing value is a voltage value of a second voltage, when the voltage of the second node N2 decreases, the compensator 16 may increase the current compensation value to maintain the suitable luminance. At this time, the compensator 16 may internally communicate with the memory 17 to receive the lookup table, the reference voltage value, and the like suitable for calculating the current compensation value.

As one or more other embodiments, the compensator 16 may receive the second sensing value during the second sensing period and may calculate the current compensation value for the first pixel PXij based on the second sensing value. In this case, the second sensing value may be a current controlled by the first transistor T1, and such a current may include information on a characteristic such as a threshold voltage and mobility in the first transistor T1. Therefore, when the information on the characteristic of the first transistor T1 is obtained from the second sensing value, the compensator 16 may calculate the current compensation values for each of the pixels in order to reduce or minimize a luminance deviation occurring between the pixels.

The compensator 16 may provide the current compensation value to the timing controller 11. The timing controller 11 may provide a compensation grayscale value (not shown) to the data driver 12 by reflecting the current compensation value to the grayscale value for the image frame from the external processor. The data driver 12 may generate a compensation data voltage (not shown) to be provided to the data line Dm by using the compensation grayscale value. The above-described embodiments may be applied to each of the pixels PXij included in the display device 10 of FIG. 1.

Hereinafter, one or more embodiments of the sensing unit 15 is for example described.

Figure 6:
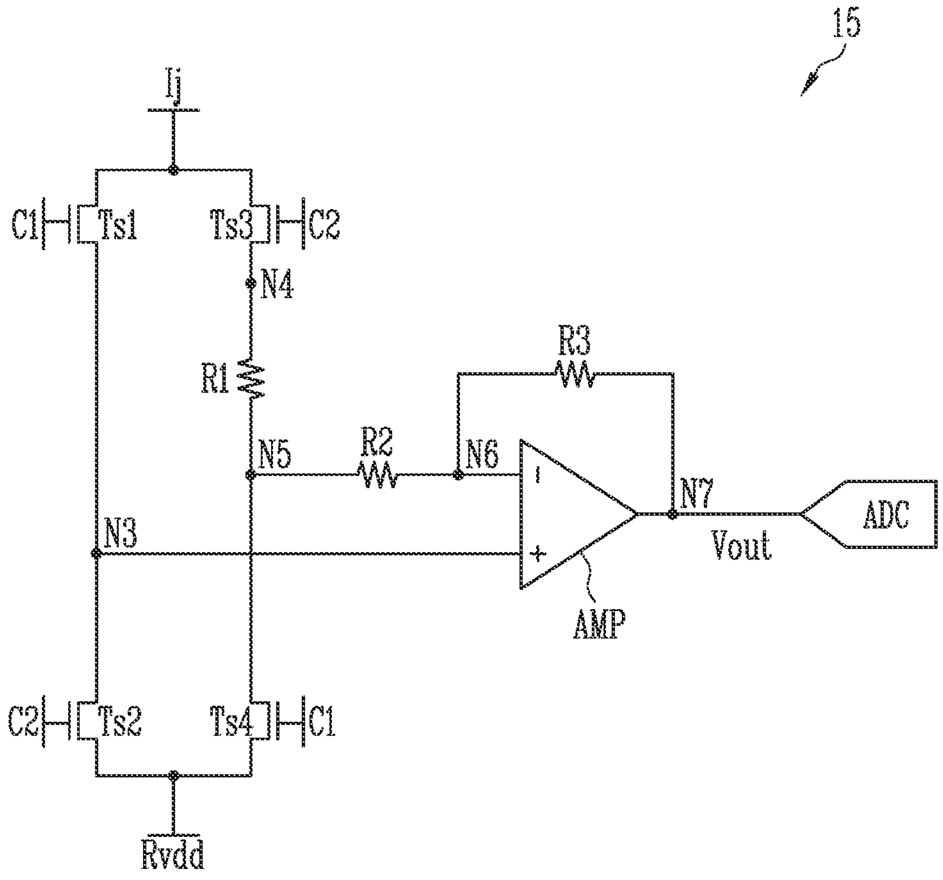
FIG. 6 is an equivalent circuit diagram illustrating one or more embodiments of the sensing unit of FIG. 5.

FIG. 6 is an equivalent circuit diagram illustrating one or more embodiments of the sensing unit 15 of FIG. 5.

Referring to FIG. 6, the sensing unit 15 may include a first sensing transistor Ts1, a second sensing transistor Ts2, a third sensing transistor Ts3, a fourth sensing transistor Ts4, a first resistor R1, a second resistor R2, a third resistor R3, an amplifier AMP, an analog-to-digital converter (ADC), and the like.

The first sensing transistor Ts1 may include a gate electrode connected to the first control line C1, a first electrode connected to the sensing line lj, and a second electrode connected to a third node N3.

The second sensing transistor Ts2 may include a gate electrode connected to the second control line C2, a first electrode connected to reference power Rvdd, and a second electrode connected to the third node N3.

The third sensing transistor Ts3 may include a gate electrode connected to the second control line C2, a first electrode connected to the sensing line lj, and a second electrode connected to a fourth node N4.

The first resistor R1 may include a first terminal connected to the fourth node N4 and a second terminal connected to a fifth node N5. A resistance value of the first resistor R1 may be a value designed by a designer and may be stored in the memory 17.

The fourth sensing transistor Ts4 may include a gate electrode connected to the first control line C1, a first electrode connected to the reference power Rvdd, and a second electrode connected to the fifth node N5.

The second resistor R2 may include a first terminal connected to the fifth node N5 and a second terminal connected to a sixth node N6. A resistance value of the second resistor R2 may be a value designed by a designer and may be stored in the memory 17.

The amplifier AMP may include a first input terminal (for example, a non-inverting terminal) connected to the third node N3, a second input terminal (for example, an inverting terminal) connected to the sixth node N6, and an output terminal connected to the analog-to-digital converter ADC and the third resistor R3. The amplifier AMP may be configured as an operational amplifier.

As one or more embodiments, the amplifier AMP may output an output voltage Vout, which is amplified according to a preset gain based on a difference between a voltage input to the first input terminal and a voltage input to the second input terminal, through the output terminal.

The third resistor R3 may include a first terminal connected to the sixth node N6 and an output terminal, for example, a second terminal connected to a seventh node N7. A resistance value of the third resistor R3 may be a value designed by a designer and may be stored in the memory 17.

Meanwhile, the voltage input to the first input terminal and the voltage input to the second input terminal of the amplifier AMP may be equipotential according to a virtual short, and a current flowing to each of the first input terminal and the second input terminal may not exist. Accordingly, when a voltage of the preset reference power Rvdd is applied to any one node of the third node N3 and the fifth node N5, an unknown voltage is applied to the other node, and thus the output voltage Vout of the amplifier AMP is output, the unknown voltage may be calculated from the voltage of the reference power Rvdd, the output voltage Vout of the amplifier AMP, the second resistor R2, and the third resistor R3. Meanwhile, when the voltage of the preset reference power Rvdd is applied to the third node N3, the unknown current flows to the first resistor R1, and thus the output voltage Vout of the amplifier AMP is output, the unknown current may also be calculated from the voltage of the reference power Rvdd, the output voltage Vout of the amplifier AMP, the second resistor R2, and the third resistor R3. A detailed description thereof is described later with reference to FIGS. 9 and 12.

The analog-to-digital converter ADC may be connected to the output terminal of the amplifier AMP. The analog-to-digital converter ADC may convert an analog signal into a digital value. For example, the analog-to-digital converter ADC may receive the output voltage Vout that is an analog signal and may convert the output voltage Vout into an output voltage value that is a digital value. The converted output voltage value may be provided to the compensator 16 shown in FIG. 5.

Hereinafter, a voltage sensing operation of the sensing unit 15 is described.

Figure 7:
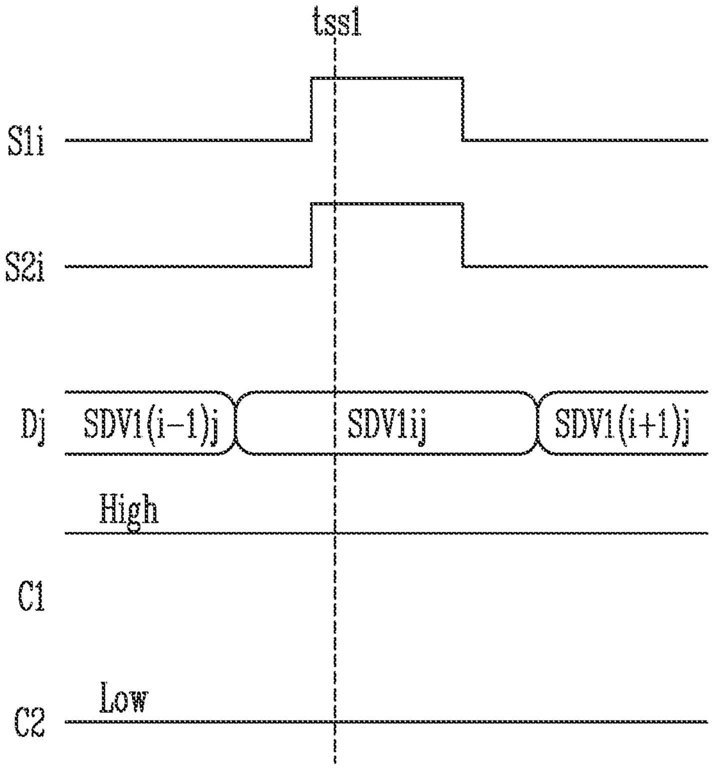
FIG. 7 is a timing diagram illustrating an operation in which the sensing unit of FIG. 5 senses a voltage in a first sensing period.
Figure 8:
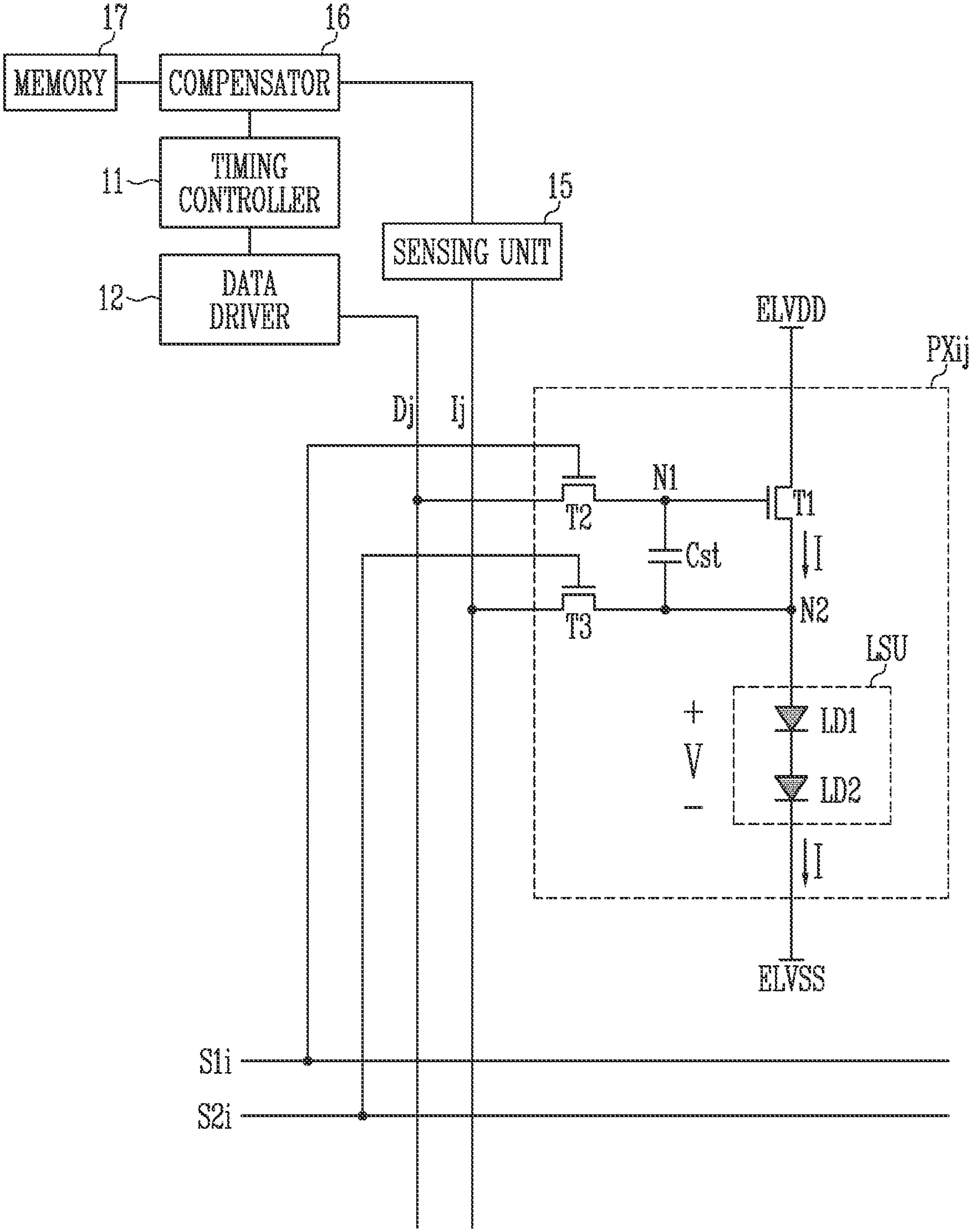
FIG. 8 is an equivalent circuit diagram illustrating a voltage and a current generated in the first pixel of FIG. 5 in the first sensing period.
Figure 9:
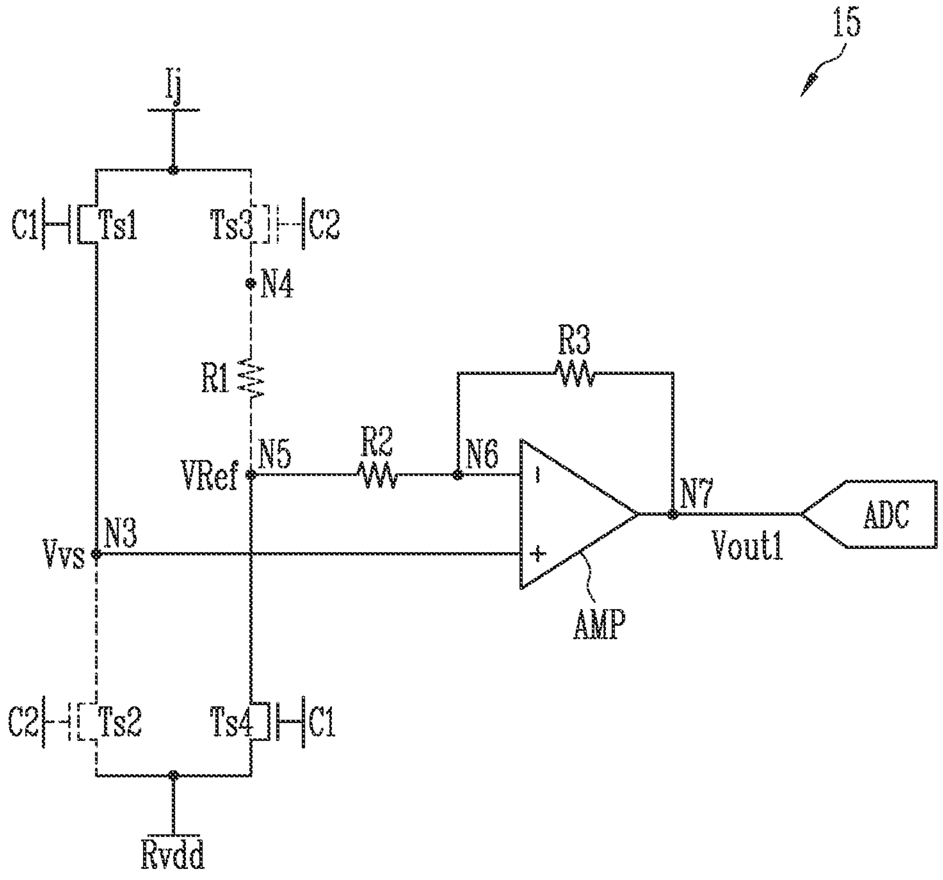
FIG. 9 is an equivalent circuit diagram illustrating an operation in which the sensing unit of FIG. 6 senses a voltage of a second node in the first sensing period.

FIG. 7 is a timing diagram illustrating an operation in which the sensing unit 15 of FIG. 5 senses a voltage in the first sensing period, FIG. 8 is an equivalent circuit diagram illustrating a voltage and a current generated in the first pixel PXij of FIG. 5 in the first sensing period, and FIG. 9 is an equivalent circuit diagram illustrating an operation in which the sensing unit 15 of FIG. 6 senses the voltage of the second node N2 in the first sensing period.

Referring to FIG. 7, during the sensing period, first sensing data voltages SDV1(*i*−1)j, SDV1*ij*, and SDV1(*i*+1)j may be sequentially applied to the data line Dj in the horizontal period unit. Meanwhile, the scan signal of the turn-on level may be applied to the first scan line S1*i* in a corresponding horizontal period. In addition, in synchronization with the first scan line S1*i*, the scan signal of the turn-on level may be applied to the second scan line S2*i*. Meanwhile, the control signal of the turn-on level may be applied to the first control line C1, and the control signal of the turn-off level may be applied to the second control line C2.

Referring to FIGS. 7 and 8, for example, during the first sensing period, when the scan signal of the turn-on level is supplied to each of the first scan line and the second scan line, the second transistor T2 and the third transistor T3 may be turned on. A first sensing data voltage SDV1*ij* may be supplied to the data line Dj at an arbitrary time point (for example, tss1) during which the turn-on state of the second transistor T2 is maintained. A voltage corresponding to a difference between the first sensing data voltage SDV1*ij* and initial power (not shown) applied to the second node N2 is written to the storage capacitor Cst of the first pixel PXij. In addition, in the first pixel PXij, according to the voltage difference between the gate electrode and the source electrode (for example, the second electrode) of the first transistor T1, a current I may flow through a path between the first power ELVDD, the first transistor T1, and the second power ELVSS, and as the current I flows, a voltage V may be generated in the light source unit LSU. Here, the voltage of the second node N2 may correspond to a sum of a voltage of the second power ELVSS and the voltage V generated in the light source unit LSU. At this time, because the third transistor T3 is turned on, the voltage of the second node N2 may be supplied to the sensing line lj.

Referring to FIGS. 7 to 9, during the first sensing period, when the control signal of the turn-on level is supplied to the first control line C1, and the control signal of the turn-off level is supplied to the second control line C2, the first sensing transistor Ts1 and the fourth sensing transistor Ts4 may be turned on, and the second sensing transistor Ts2 and the third sensing transistor Ts3 may be turned off. At this time, the voltage of the second node N2 may be applied to the third node N3 through the sensing line lj, and the voltage of the reference power Rvdd may be applied to the fifth node N5. In this case, the amplifier AMP may output a first output voltage based on a voltage of the third node N3 and the voltage of the reference power Rvdd, the output first output voltage may be input to the analog-to-digital converter ADC, and a first output voltage value of the first output voltage may be provided to the compensator 16. The compensator 16 may obtain the voltage value (the first sensing value) of the voltage of the second node N2 from the first output voltage value of the first output voltage.

For example, the voltage of the third node N3 applied to the first input terminal of the amplifier AMP and a voltage applied to the second input terminal of the amplifier AMP (that is, a voltage of the sixth node N6) may be equipotential, and a current flowing through the second resistor R2 and a current flowing through the third resistor R3 are the same. This may be expressed as [Equation 1] below.

$$\frac{(V_{ref} - V_{vs})}{R_2} = \frac{(V_{vs} - V_{out1})}{R_3} \quad \text{Equation 1}$$

Here, $V_{ref}$ means the voltage of the reference power Rvdd, $V_{VS}$ means the voltage of the third node N3, $V_{out1}$ means the first output voltage, $R_2$ means the second resistor, and $R_3$ means the third resistor.

Here, the voltage of the third node N3 may be expressed as [Equation 2] below by summarizing terms of [Equation 1].

$$V_{vs} = \frac{(R_2 V_{out1} + R_3 V_{ref})}{(R_2 + R_3)} \quad \text{Equation 2}$$

Here, because digital values of the voltage of the reference power Rvdd, the second resistor R2, and the third resistor R3 may be stored in the memory 17 in advance and the first output voltage that is the digital value of the first output voltage is output by the analog-to-digital converter ADC, the compensator 16 may calculate a voltage value of the voltage of the third node N3 by substituting the digital values of the voltage of the reference power Rvdd, the second resistor R2, and the third resistor R3, and the first output voltage value into the above-described [Equation 2]. Accordingly, the voltage of the second node N2 corresponding to the voltage of the third node N3 may be measured.

When the second resistor R2 and the third resistor R3 are the same, the voltage of the third node N3 may be expressed as [Equation 3] below.

$$V_{vs} = \frac{(V_{out1} + V_{ref})}{2} \quad \text{Equation 3}$$

Meanwhile, the compensator 16 may calculate a change amount of the voltage of the second node N2 based on the first output voltage value of the first output voltage and the preset reference voltage value. Here, the reference voltage value may be stored in the memory 17 as described above with reference to FIG. 1. For example, the compensator 16 may calculate the voltage value (first sensing value) of the voltage of the second node N2 corresponding to the voltage of the third node N3 using the above-described [Equation 2] ([Equation 3] when the second resistor R2 and the third resistor R3 are the same), may receive the reference voltage value from the memory 17, and may calculate a difference value between the reference voltage value and the voltage value of the voltage of the second node N2, a decrease ratio of the voltage value of the voltage of the second node N2 compared to the reference voltage value, and the like, to calculate the change amount of the voltage of the second node N2. At this time, the compensator 16 may increase the current compensation value as the change amount increases.

Here, as one or more embodiments of calculating the current compensation value of the second node N2, the compensator 16 may calculate a decrease ratio (that is, first sensing value/reference voltage value) that is a ratio of the sensing value (for example, the first sensing value of the voltage of the second node N2 to the reference voltage value), may extract compensation amount data corresponding to decrease ratio data from a pre-stored lookup table, and may calculate the current compensation value from the extracted compensation amount data.

According to the above-described embodiments, there is an aspect that an operation speed is increased by calculating the current compensation value using the lookup table set before the shipment of the display device 10 of FIG. 1.

As one or more other embodiments of calculating the current compensation value of the second node N2, the compensator 16 may increase the current compensation value inversely proportionally to a decrease amount of the voltage of the second node N2, so that power consumption in the light source unit LSU is always constant. For example, the compensator 16 may calculate as the current compensation value based on a ratio (that is, reference voltage value/the first sensing value) of the reference voltage value to the sensing value (for example, the first sensing value) of the voltage of the second node N2. For example, when the ratio of the first sensing value to the reference voltage value is ⅔, because the ratio of the reference voltage value to the first sensing value corresponding to a reciprocal of the ratio is 3/2, that is, 1.5, the compensator 16 may calculate the current compensation value to be 1.5 times the driving current $I_D$ for the first pixel PXij.

Identically to that described above, the compensator 16 may provide the current compensation value to the timing controller 11, and the timing controller 11 may provide the compensation grayscale value (not shown) to the data driver 12 by reflecting the current compensation value to the grayscale value for the image frame from the external processor. The data driver 12 may generate the compensation data voltage (not shown) to be provided to the data line Dm by using the compensation grayscale value. The above-described embodiments may be applied to each of the pixels PXij included in the display device 10 of FIG. 1.

According to one or more embodiments, when a first current compensation value for the first pixel PXij and a second current compensation value for a second pixel (not shown) are different from each other, even though the timing controller 11 receives the same grayscale values for the first pixel PXij and the second pixel from the external processor, the data driver 12 may provide different data voltages to the first pixel PXij and the second pixel.

For example, when the first current compensation value is greater than the second current compensation value, the data driver 12 may provide a data voltage greater than that of the second pixel to the first pixel PXij to allow a greater driving current to flow through the first pixel.

However, differently from that shown in FIG. 2, when the first transistor T1 of the pixel PXij is configured as a P-type transistor, the data driver 12 may provide a data voltage that is less than that of the second pixel to the first pixel PXij to allow a greater driving current flow through the first pixel PXij.

According to the above-described embodiments, there is an aspect that accuracy is increased by calculating the current compensation value in real time according to the voltage of the second node N2 sensed after shipment.

Hereinafter, a current sensing operation of the sensing unit 15 is described.

Figure 10:
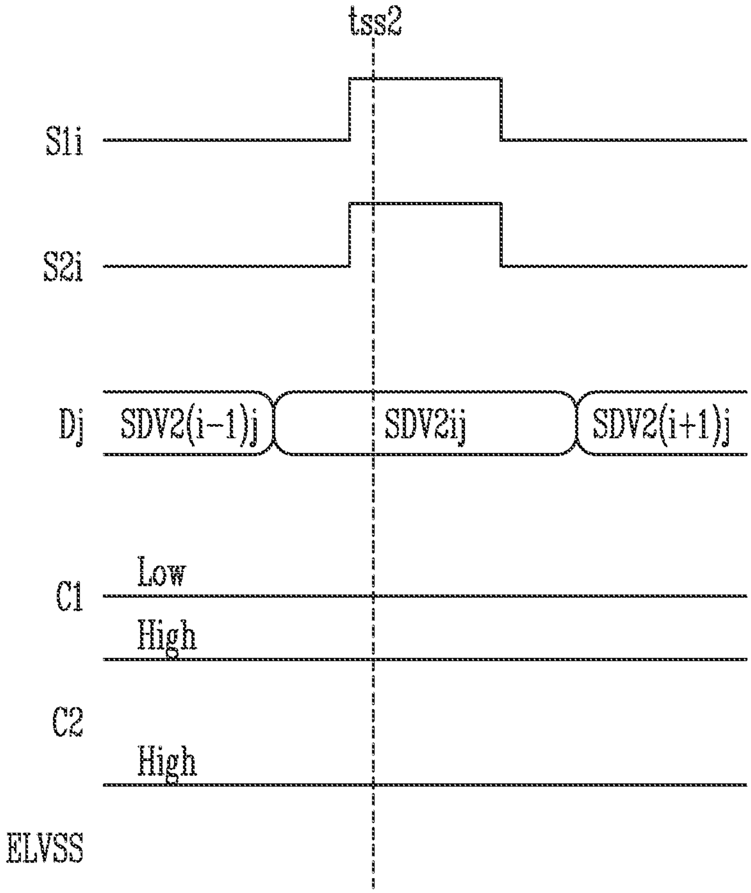
FIG. 10 is a timing diagram illustrating an operation in which the sensing unit of FIG. 5 senses a current in a second sensing period.
Figure 11:
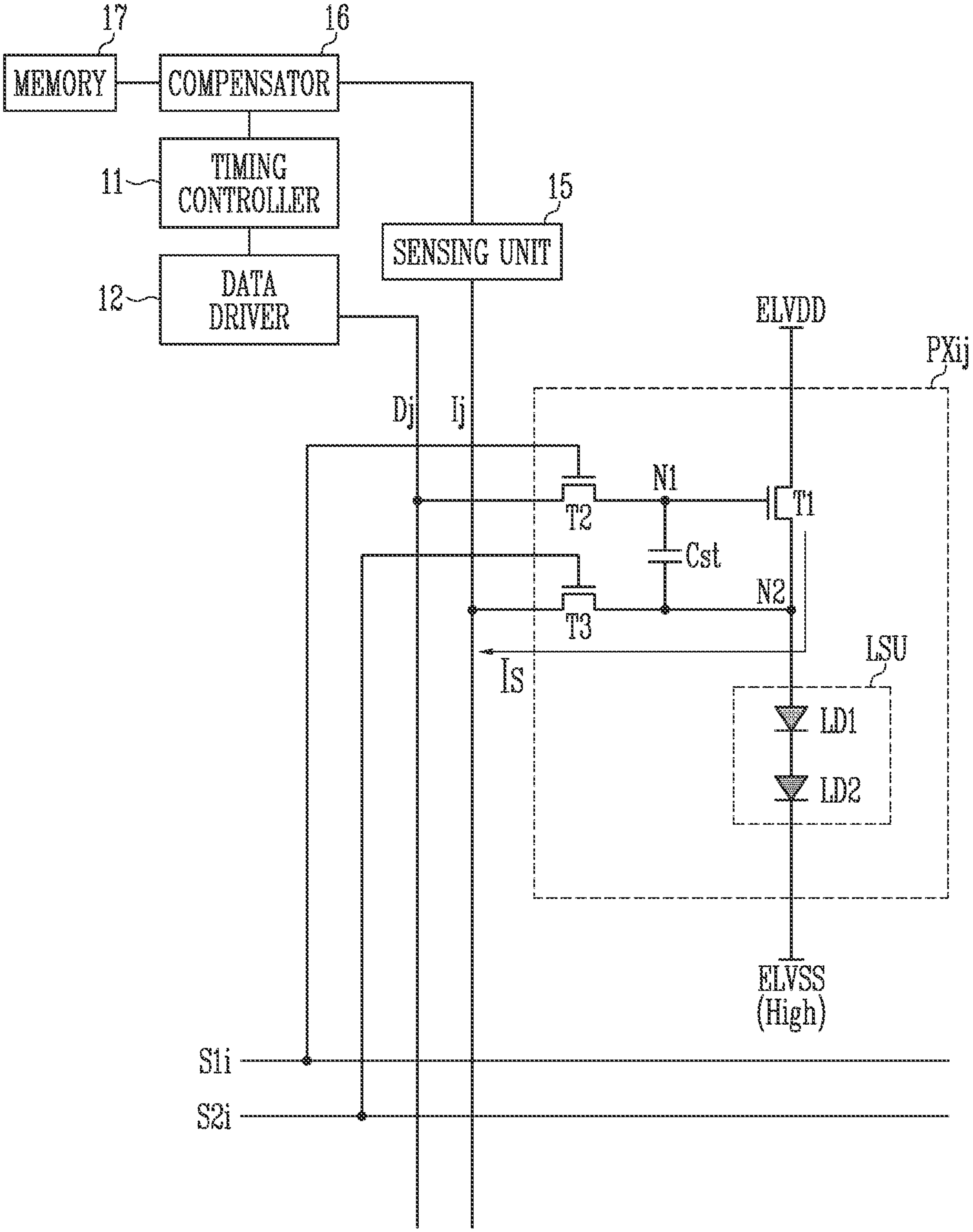
FIG. 11 is an equivalent circuit diagram illustrating a voltage and a current generated in the first pixel of FIG. 5 in the second sensing period.
Figure 12:
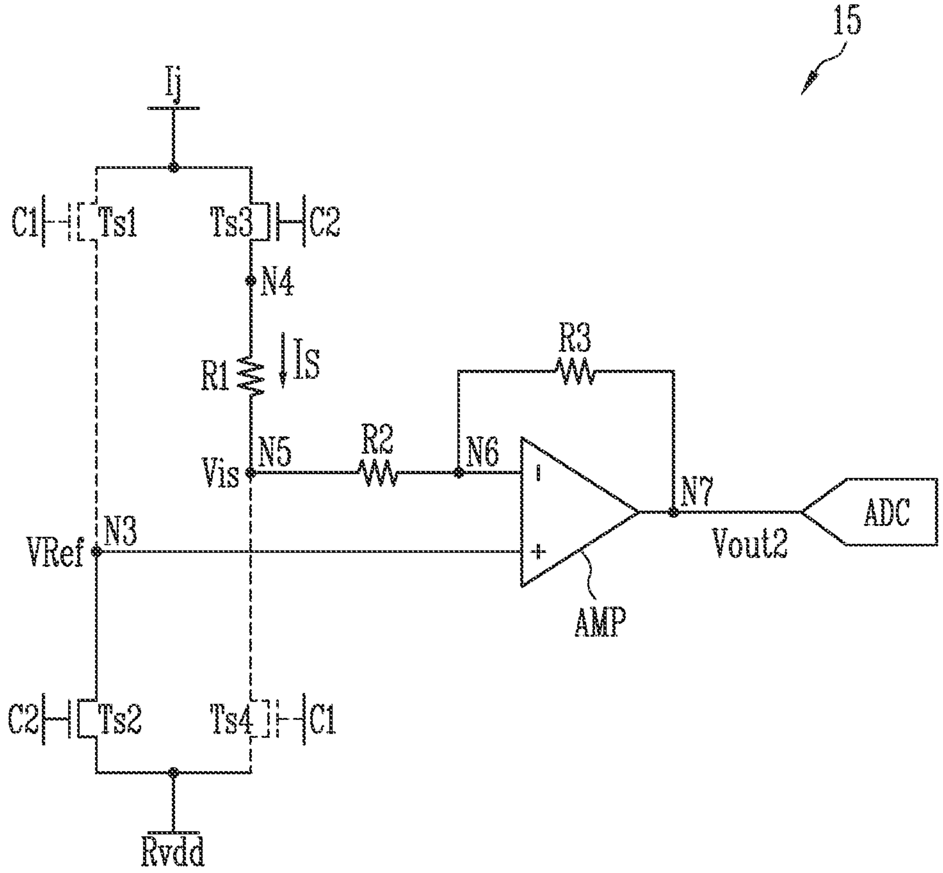
FIG. 12 is an equivalent circuit diagram illustrating an operation in which the sensing unit of FIG. 6 senses the current of the first pixel in the second sensing period.

FIG. 10 is a timing diagram illustrating an operation in which the sensing unit 15 of FIG. 5 senses the current in the second sensing period, FIG. 11 is an equivalent circuit diagram illustrating the voltage and the current generated in the first pixel PXij of FIG. 5 in the second sensing period, and FIG. 12 is an equivalent circuit diagram illustrating an operation in which the sensing unit 15 of FIG. 6 senses the current of the first pixel PXij in the second sensing period.

Referring to FIG. 10, during the sensing period, second sensing data voltages SDV2(*i*−1)j, SDV2*ij*, and SDV2(*i*+1)j may be sequentially applied to the data line Dj in the horizontal period unit. Here, the second sensing data voltages SDV2(*i*−1)j, SDV2*ij*, and SDV2(*i*+1)j may be identical to or different from the first sensing data voltages SDV1(*i*−1)j, SDV1*ij*, and SDV1(*i*+1)j. Meanwhile, the scan signal of the turn-on level may be applied to the first scan line S1*i* in a corresponding horizontal period. In addition, in synchronization with the first scan line S1*i*, the scan signal of the turn-on level may be applied to also the second scan line S2*i*. In addition, the voltage of the second power ELVSS may be maintained in a state in which the voltage of the second power ELVSS is increased from a first level to a second level. Here, when the first level is, for example, a low level, the second level may be a high level. Meanwhile, the control signal of the turn-off level may be applied to the first control line C1, and the control signal of the turn-on level may be applied to the second control line C2.

Referring to FIGS. 10 and 11, for example, during the second sensing period, when the scan signal of the turn-on level is supplied to each of the first scan line and the second scan line, the second transistor T2 and the third transistor T3 may be turned on. A second sensing data voltage SDV2*ij* may be supplied to the data line Dj at an arbitrary time point (for example, time point tss2) during which the turn-on state of the second transistor T2 is maintained. A voltage corresponding to a difference between the second sensing data voltage SDV2*ij* and the initial power (not shown) applied to the second node N2 is written to the storage capacitor Cst of the first pixel PXij. In addition, in the first pixel PXij, a sensing current $I_S$ is determined according to the voltage difference between the gate electrode and the source electrode of the first transistor T1. At this time, because the third transistor T3 is turned on, the sensing current $I_S$ may be supplied to the sensing unit 15 through the sensing line lj.

Referring to FIGS. 10 to 12, during the second sensing period, when the control signal of the turn-off level is supplied to the first control line C1, and the control signal of the turn-on level is supplied to the second control line C2, the first sensing transistor Ts1 and the fourth sensing transistor Ts4 may be turned off and the second sensing transistor Ts2 and the third sensing transistor Ts3 may be turned on. At this time, the sensing current $I_S$ may flow to the first resistor R1 through the sensing line lj and the third sensing transistor Ts3, and a voltage of the fifth node N5 may be generated according to the flow of the sensing current $I_S$. In addition, the voltage of the reference power Rvdd may be applied to the third node N3. In this case, the amplifier AMP may output a second output voltage based on the voltage of the fifth node N5 and the voltage of the reference power Rvdd, the output second output voltage may be input to the analog-to-digital converter ADC, and thus a second output voltage value of the second output voltage may be provided to the compensator 16. The compensator 16 may obtain a current value of the sensing current $I_S$ from the second output voltage value of the second output voltage.

For example, similarly to that described, the voltage of the reference power Rvdd applied to the first input terminal of the amplifier AMP and the voltage applied to the second input terminal of the amplifier AMP (that is, the voltage of the sixth node N6) may be equipotential, and the sensing current $I_S$ flowing through the first resistor R1, a current flowing through the second resistor R2, and a current flowing through the third resistor R3 are the same. This may be expressed as [Equation 4] below.

$$Is = \frac{(V_{is} - V_{ref})}{R_2} = \frac{(V_{ref} - V_{out2})}{R_3} \quad \text{Equation 4}$$

Here, $I_S$ means the sensing current, Vref means the voltage of the reference power Rvdd, $V_{is}$ means the voltage of the fifth node N5, $V_{out2}$ means the second output voltage, $R_2$ is means the second resistor, and $R_3$ means the third resistor.

Here, because the digital values of the voltage of the reference power Rvdd, the second resistor R2, and the third resistor R3 are stored in the memory 17 in advance and the second output voltage that is a digital value of the second output voltage is output by the analog-to-digital converter ADC, the compensator 16 may calculate the current value of the sensing current $I_S$ by substituting the digital values of the voltage of the reference power Rvdd and the third resistor R3, and the second output voltage value into the above-described [Equation 4]. Accordingly, the sensing current $I_S$ may be measured.

Meanwhile, the compensator 16 may calculate a change amount of the sensing current $I_S$ based on the second output voltage value of the second output voltage and a preset reference current value. For example, the compensator 16 may calculate the current value (the second sensing value) of the sensing current $I_S$ using the above-mentioned [Equation 4], may receive the reference current value from the memory 17, and may calculate a difference value of the reference current value and the current value of the sensing current $I_S$, a decrease ratio of the current value of the sensing current $I_S$ compared to the reference current value, and the like, to calculate the change amount of the sensing current $I_S$. In addition, the current compensation value may be calculated based on the change amount of the sensing current $I_S$.

According to the above-described embodiments, because an operation of sensing the voltage and the current applied to the light emitting diodes is implemented with a relatively simple circuit structure, there is an aspect that a manufacturing terminal may be reduced.

In addition, according to the above-described embodiments, there is an aspect that a more integrated display device 10 may be provided by implementing a circuit structure capable of sensing the voltage and the current applied to the light emitting diodes.

Figure 13:
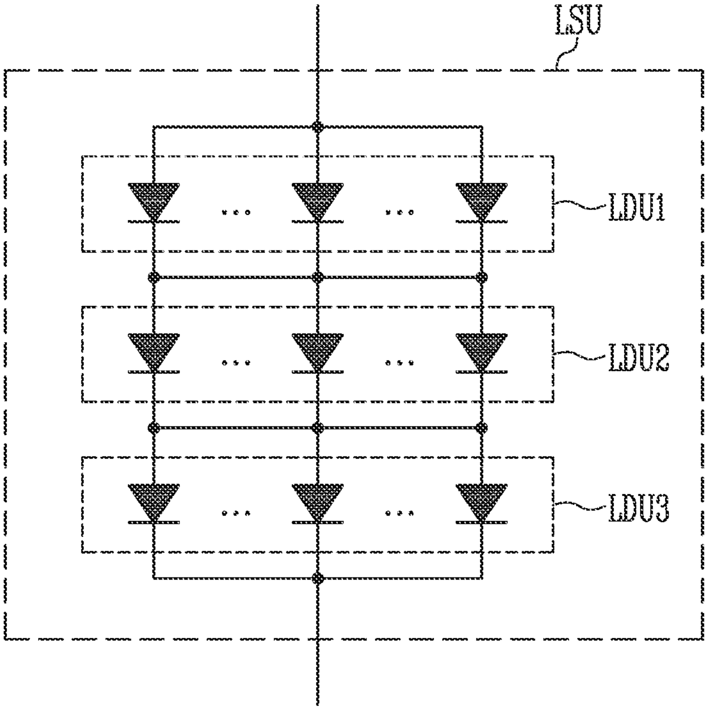
FIG. 13 is a diagram illustrating a light source unit of the present disclosure.
Figure 14:
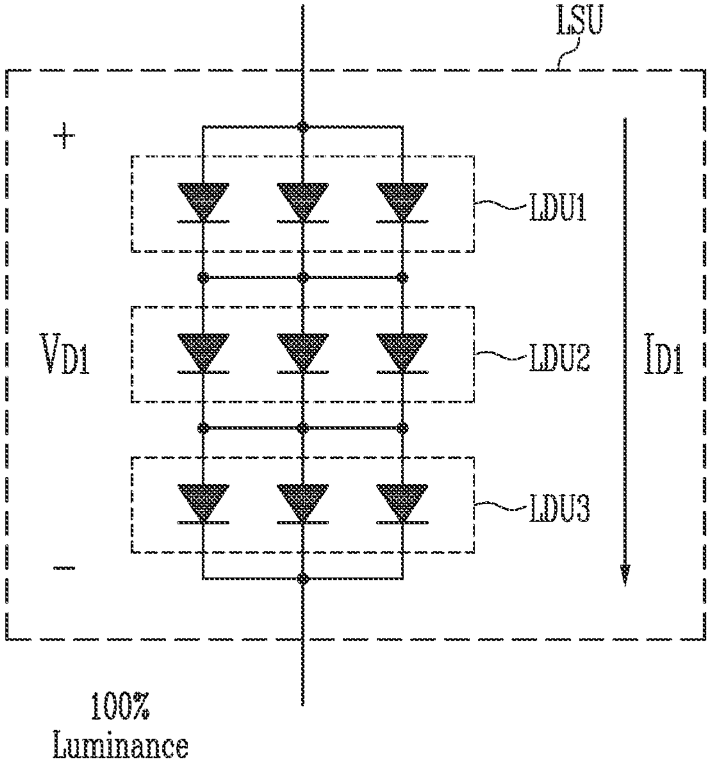
FIG. 14 is a diagram illustrating a voltage and a current applied to the light source unit of FIG. 13.
Figure 15:
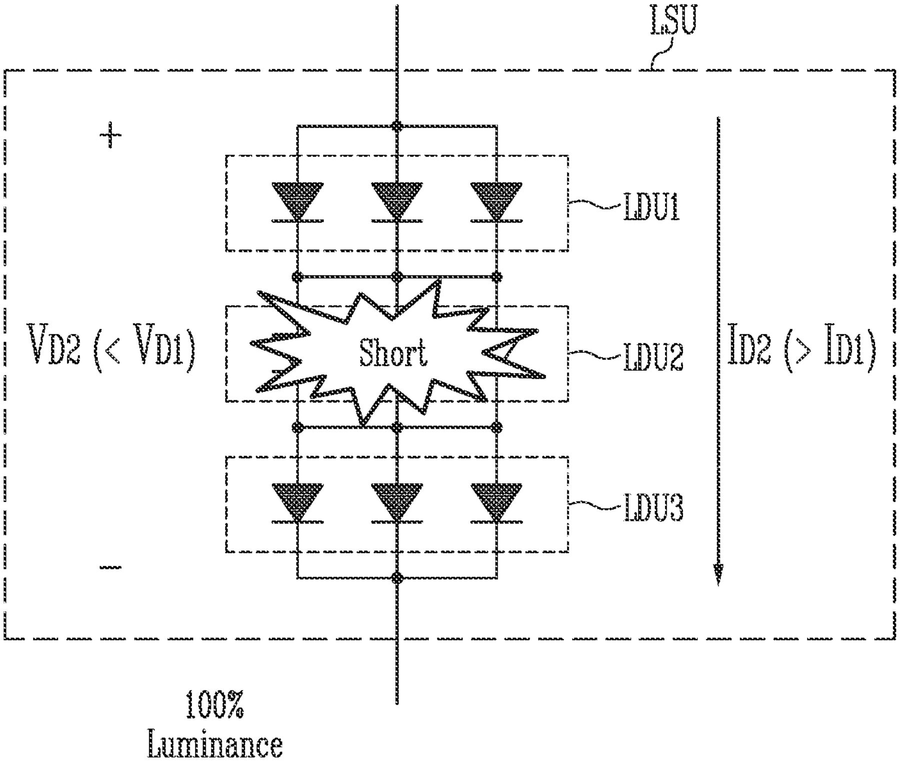
FIGS. 15 and 16 are diagrams illustrating magnitude changes of each of a voltage and a current applied to the light source unit when a light emitting diode is shorted.
Figure 16:
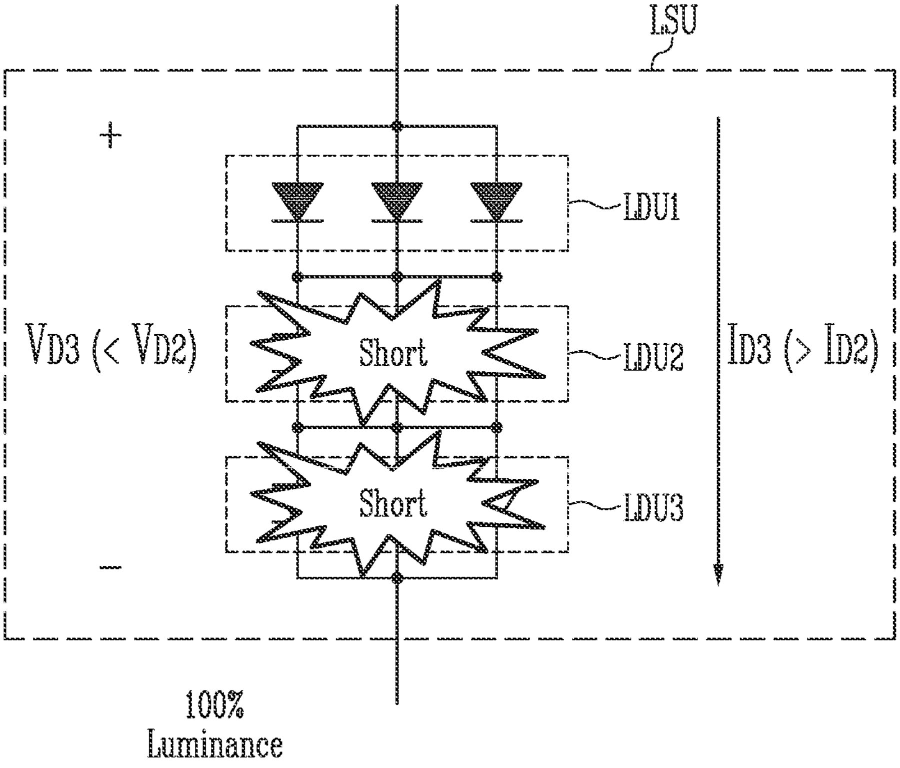

FIG. 13 is a diagram illustrating a light source unit LSU of the present disclosure, FIG. 14 is a diagram illustrating a voltage and a current applied to the light source unit LSU of FIG. 13, and FIGS. 15 and 16 are diagrams illustrating magnitude changes of each of the voltage and the current applied to the light source unit LSU when the light emitting diode is shorted.

Referring to FIG. 13, the light source unit LSU shown in FIG. 13 may include three or more light emitting diodes differently from the light source unit LSU shown in FIGS. 2, 4, 5, 8, and 11.

Here, the light emitting diodes included in the light source unit LSU shown in FIG. 13 may be connected in a combination of a series structure and a parallel structure, and may include light emitting diode units in which one or more light emitting diodes are grouped. For example, the light source unit LSU may include a first light emitting diode unit LDU1, a second light emitting diode unit LDU2, and a third light emitting diode unit LDU3, and the number of light emitting diodes included in each of the first light emitting diode unit LDU1, the second light emitting diode unit LDU2, and the third light emitting diode unit LDU3 may be the same or different from each other. However, the present disclosure is not limited thereto. Hereinafter, for convenience, embodiments of the present disclosure are described based on each of the first light emitting diode unit LDU1, the second light emitting diode unit LDU2, and the third light emitting diode unit LDU3 including the same number of light emitting diodes.

The light emitting diode unit may mean a group of light emitting diodes connected only in a parallel structure. In addition, one light emitting diode unit and another light emitting diode unit may be connected to each other in a series structure. For example, the first light emitting diode unit LDU1, the second light emitting diode unit LDU2, and the third light emitting diode unit LDU3 may be connected to each other in a series structure.

Meanwhile, because a connection structure between the light emitting diode units is a series structure, a current flowing through each of the light emitting diode units may be the same. Meanwhile, because a connection structure between the plurality of light emitting diodes included in any one light emitting diode unit is a parallel structure, a voltage generated in one light emitting diode unit and voltages generated in each of a plurality of light emitting diodes included in the one light emitting diode unit may be the same.

Referring to FIG. 14, for example, when a first driving current $I_{D1}$ flows through the light source unit LSU according to the luminance that is suitable in the first pixel PXij, the first driving current $I_{D1}$ may flow through each of the first light emitting diode unit LDU1, the second light emitting diode unit LDU2, and the third light emitting diode unit LDU3. In addition, when a first driving voltage $V_{D1}$ is generated in the light source unit LSU, the first driving voltage $V_{D1}$ may be equally distributed to each of the first light emitting diode unit LDU1, the second light emitting diode unit LDU2, and the third light emitting diode unit LDU3. That is, a voltage generated in each of the first light emitting diode unit LDU1, the second light emitting diode unit LDU2, and the third light emitting diode unit LDU3 may be ⅓ of the first driving voltage $V_{D1}$.

Meanwhile, when at least one light emitting diode among the light emitting diodes included in one light emitting diode unit is shorted, the one light emitting diode unit does not emit light. In this case, since the voltage generated in the light source unit LSU is decreased, when the driving current is not compensated, the light source unit LSU may not emit light with a suitable luminance. Therefore, as described above, the display device 10 according to one or more embodiments of the present disclosure may compensate for the driving current by sensing the voltage generated in the light source unit LSU.

Referring to FIG. 15, for example, when at least one light emitting diode included in the second light emitting diode unit LDU2 is shorted, the second light emitting diode unit LDU2 does not emit light. At this time, the voltage generated in the light source unit LSU may be changed from the first driving voltage $V_{D1}$ to a second driving voltage $V_{D2}$. Here, the second driving voltage $V_{D2}$ may be less than the first driving voltage $V_{D1}$. In this case, the display device 10 according to one or more embodiments of the present disclosure may sense the second driving voltage $V_{D2}$, calculate the current compensation value by calculating a change amount of the driving voltage, and increase the first driving current $I_{D1}$ for the first pixel PXij by providing the compensation data voltage according to the compensation grayscale value, so that power consumption of the light source unit LSU is maintained. In this case, since a second driving current $I_{D2}$ greater than the first driving current $I_{D1}$ flows in the light source unit LSU shown in FIG. 15, the light source unit LSU may emit light with the luminance that is suitable in the first pixel PXij.

For example, the display device 10 according to one or more embodiments of the present disclosure calculates a first ratio of the first driving voltage $V_{D1}$ to the second driving voltage $V_{D2}$ and calculates the current compensation value in which a reciprocal number of the first ratio is a multiple of the first driving current $I_{D1}$. The display device 10 generates the compensation grayscale value by reflecting the calculated compensation value to the received grayscale value, and supplies the compensation data voltage according to the compensation grayscale value to the first pixel PXij including the light source unit LSU shown in FIG. 15A. The second driving current $I_{D2}$ according to the compensation data voltage may flow in the light source unit LSU shown in FIG. 15, and at this time, the second driving current $I_{D2}$ may be the same as a product of the first driving current $I_{D1}$ and the reciprocal number of the first ratio.

In other words, since the voltage generated in each of the first light emitting diode unit LDU1, the second light emitting diode unit LDU2, and the third light emitting diode unit LDU3 is ⅓ of the first driving voltage $V_{D1}$, when the second light emitting diode unit LDU2 does not emit light, the second driving voltage $V_{D2}$ may be ⅔ of the first driving voltage $V_{D1}$. Therefore, the first ratio may be ⅔, and the second driving current $I_{D2}$ may be 1.5 times the first driving current $I_{D1}$.

Meanwhile, referring to FIG. 16, for example, when at least one light emitting diode included in the third light emitting diode unit LDU3 is further shorted, the second light emitting diode unit LDU2 and the third light emitting diode unit LDU3 do not emit light. At this time, the voltage generated in the light source unit LSU may be changed from the second driving voltage $V_{D2}$ to a third driving voltage $V_{D3}$. Here, the third driving voltage $V_{D3}$ may be less than the second driving voltage $V_{D2}$. Also in this case, similarly to that described above, the display device 10 according to one or more embodiments of the present disclosure may sense the third driving voltage $V_{D3}$, calculate the current compensation value by calculating the change amount of the driving current, and increase the second driving current $I_{D2}$ for the first pixel PXij by providing the compensation data voltage according to the compensation grayscale value to the first pixel PXij, so that the power consumption of the light source unit LSU is maintained. In this case, since a third driving current $I_{D3}$ greater than the second driving current $I_{D2}$ flows in the light source unit LSU shown in FIG. 16, the light source unit LSU may continuously emit light with the luminance that is suitable in the first pixel PXij.

For example, the display device 10 according to one or more embodiments of the present disclosure may calculate a second ratio of the first driving voltage $V_{D1}$ to the third driving voltage $V_{D3}$, and calculates the current compensation value in which a reciprocal number of the second ratio is a multiple of the first driving current $I_{D1}$. The display device 10 generates the compensation grayscale value by reflecting the calculated compensation value to the received grayscale value, and supplies the compensation data voltage according to the compensation grayscale value to the first pixel PXij including the light source unit LSU shown in FIG. 16A. The third driving current $I_{D3}$ according to the compensation data voltage may flow in the light source unit LSU shown in FIG. 16, and at this time, the third driving current $I_{D3}$ may be the same as a product of the first driving current IM and the reciprocal number of the second ratio.

In other words, since the voltage generated in each of the first light emitting diode unit LDU1, the second light emitting diode unit LDU2, and the third light emitting diode unit LDU3 is ⅓ of the first driving voltage $V_{D1}$, when both of the second light emitting diode unit LDU2 and the third light emitting diode unit LDU3 do not emit light, the third driving voltage $V_{D3}$ may be ⅓ of the first driving voltage $V_{D1}$. At this time, the second ratio may be ⅓, and the third driving current $I_{D3}$ may be three times the first driving current $I_{D1}$.

Since the light source unit shown in FIGS. 14 to 16 is shown to describe embodiments of the present disclosure, the number of light emitting diode units, the number of light emitting diodes, and the like are not limited to those shown in FIGS. 14 to 16.

According to that described above, the display device 10 according to one or more embodiments of the present disclosure may reduce or minimize the luminance deviation by calculating the current compensation value so that a corresponding pixel emits light with a requested luminance even though the light emitting diode is shorted.

In addition, according to that described above, the display device 10 according to one or more embodiments of the present disclosure may extend a lifespan of the product by maintaining the luminance requested for each of the pixels.

Hereinafter, a method of driving a display device 10 according to one or more embodiments of the present disclosure is for example described.

Figure 17:
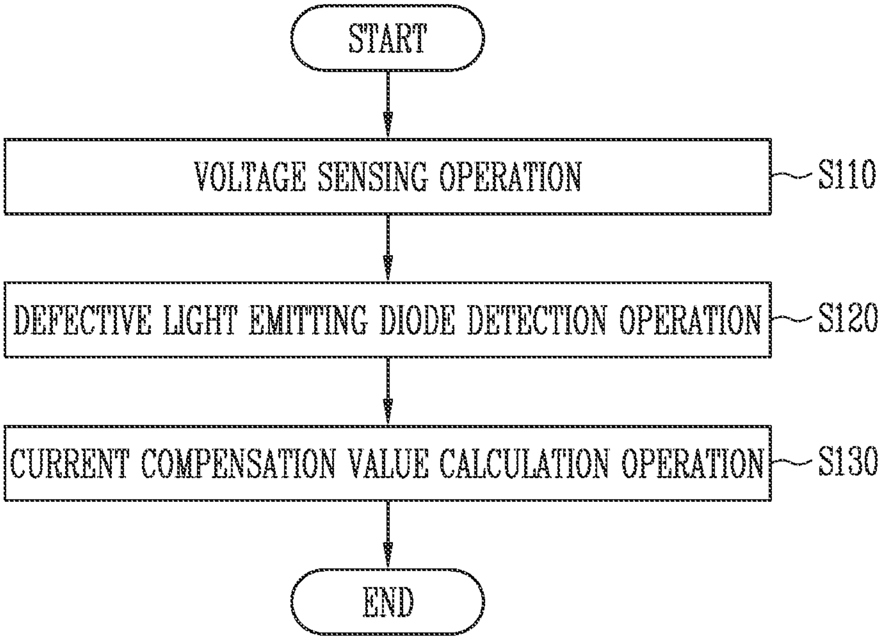
FIG. 17 is a flowchart illustrating a method of driving a display device according to one or more embodiments.

FIG. 17 is a flowchart illustrating a method of driving the display device 10 according to one or more embodiments.

Referring to FIG. 17, the method of driving the display device 10 according to one or more embodiments of the present disclosure may be a method of detecting a defective shorted light emitting diode among a plurality of light emitting diodes included in a pixel, and calculating a current compensation value when the defective light emitting diode is detected.

Such a driving method may include a voltage sensing operation S110, a defective light emitting diode detection operation S120, a current compensation value calculation operation S130, and the like.

The voltage sensing operation S110 corresponds to an operation of sensing a voltage applied to the plurality of light emitting diodes included in the pixel.

Here, identically to the first pixel PXij described above, the pixel may include: the first transistor including the gate electrode connected to the first node N1, the first electrode connected to the first power ELVDD, and the second electrode connected to the second node N2; the first light emitting diode LD1 including the anode connected to the second node N2, and the cathode; and the second light emitting diode LD2 including the anode connected in series with the cathode of the first light emitting diode LD1, and the cathode connected to the second power ELVSS. At this time, the voltage sensing operation S110 senses the voltage of the second node N2.

The defective light emitting diode detection operation S120 corresponds to an operation of detecting whether the shorted defective light emitting diode exists in the pixel based on a voltage and a preset reference voltage.

Here, the defective light emitting diode detection operation S120 may determine that the defective light emitting diode exists when the voltage of the second node N2 is less than the reference voltage.

When the defective light emitting diode is detected, the current compensation value calculation operation S130 corresponds to an operation of calculating a current compensation value for the pixel and increasing the current compensation value as the voltage decreases.

Here, the current compensation value calculation operation S130 calculates a change amount of the voltage of the second node N2 based on the voltage of the second node N2 and the reference voltage, and increases the current compensation value as the change amount increases.

As described above, embodiments of the present disclosure may provide the display device and the method of driving the same, which reduce or minimize the luminance deviation between the pixels by allowing a corresponding pixel to emit light with an appropriate luminance even though the light emitting diode is shorted.

Although the embodiments of the present disclosure have been described with reference to the accompanying drawings, those skilled in the art will understand that the embodiments may be implemented in other specific forms without changing the technical spirit and essential features of the present disclosure. Therefore, it should be understood that the embodiments described above are illustrative and are not restrictive in all aspects.

The invention claimed is:

1. A display device comprising:
pixels;
a sensing unit connected to the pixels through sensing lines; and
a compensator configured to calculate a current compensation value for each of the pixels based on a sensing value of the sensing unit,
wherein a first pixel among the pixels comprises:
a first transistor including a gate electrode connected to a first node, a first electrode connected to first power, and a second electrode connected to a second node;

a first light emitting diode including an anode connected to the second node, and a cathode; and a second light emitting diode including an anode connected to the cathode of the first light emitting diode in series, and a cathode connected to a second power, wherein the sensing unit is configured to output the sensing value by sensing a voltage of the second node in a sensing period, wherein the compensator is configured to increase the current compensation value for the first pixel as the voltage of the second node decreases in the sensing period, and wherein the first pixel further comprises:

a second transistor including a gate electrode connected to a first scan line, a first electrode connected to a data line, and a second electrode connected to the first node; and a third transistor including a gate electrode connected to a second scan line, a first electrode connected to the second node, and a second electrode connected to a respective one of the sensing lines.

2. The display device according to claim 1, wherein a scan signal of a turn-on level is configured to be supplied to the first scan line during a display period, wherein a scan signal of a turn-off level is configured to be supplied to the second scan line during the display period, and wherein a data voltage is configured to be supplied to the data line during the display period.

3. The display device according to claim 1, wherein a scan signal of a turn-on level is configured to be supplied to the first scan line during the sensing period, wherein the scan signal of the turn-on level is configured to be supplied to the second scan line during the sensing period, and wherein a sensing data voltage is configured to be supplied to the data line during the sensing period.

4. The display device according to claim 1, wherein a scan signal of a turn-on level is configured to be supplied to the first scan line during the sensing period, wherein the scan signal of the turn-on level is configured to be supplied to the second scan line during the sensing period, wherein a sensing data voltage is configured to be supplied to the data line during the sensing period, and wherein a voltage of the second power is configured to be maintained in a state in which the voltage of the second power is increased from a first level to a second level.

5. The display device according to claim 1, wherein the sensing unit comprises:

a first sensing transistor including a gate electrode connected to a first control line, a first electrode connected to a respective one of the sensing lines, and a second electrode connected to a third node;

a second sensing transistor including a gate electrode connected to a second control line, a first electrode connected to a reference power, and a second electrode connected to the third node;

a third sensing transistor including a gate electrode connected to the second control line, a first electrode connected to the respective one of the sensing lines, and a second electrode connected to a fourth node;

a first resistor including a first terminal connected to the fourth node and a second terminal connected to a fifth node;

a fourth sensing transistor including a gate electrode connected to the first control line, a first electrode connected to the reference power, and a second electrode connected to the fifth node;

a second resistor including a first terminal connected to the fifth node and a second terminal connected to a sixth node;

an amplifier including a first input terminal connected to the third node, a second input terminal connected to the sixth node, and an output terminal; and a third resistor including a first terminal connected to the sixth node and a second terminal connected to the output terminal.

6. The display device according to claim 5, wherein a control signal of a turn-on level is supplied to the first control line during the sensing period, and a control signal of a turn-off level is supplied to the second control line during the sensing period.

7. The display device according to claim 6, wherein the amplifier is configured to output a first output voltage based on a voltage of the third node and a voltage of the reference power.

8. The display device according to claim 7, wherein the compensator is configured to calculate a change amount of the voltage of the second node based on a first output voltage value of the first output voltage and a reference voltage value, and is configured to increase the current compensation value as the change amount increases.

9. The display device according to claim 8, wherein the compensator is configured to calculate a decrease ratio that is a ratio of the sensing value of the voltage of the second node to the reference voltage value, is configured to extract compensation amount data corresponding to decrease ratio data from a pre-stored lookup table, and is configured to calculate the current compensation value from the extracted compensation amount data.

10. The display device according to claim 8, wherein the compensator is configured to calculate as the current compensation value based on a ratio of the reference voltage value to the sensing value of the voltage of the second node.

11. The display device according to claim 5, wherein a control signal of a turn-off level is configured to be supplied to the first control line during the sensing period, and a control signal of a turn-on level is configured to be supplied to the second control line during the sensing period.

12. The display device according to claim 11, wherein the amplifier is configured to output a second output voltage based on a voltage of the fifth node and the voltage of the reference power.

13. The display device according to claim 12, wherein the compensator is configured to calculate a change amount of a sensing current based on a second output voltage value of the second output voltage and a reference current value, and is configured to calculate the current compensation value based on the change amount.

14. The display device according to claim 1, wherein the sensing unit is configured to output a first sensing value by sensing the voltage of the second node during a first sensing period, and is configured to output a second sensing value by sensing a sensing current during a second sensing period that does not overlap the first sensing period.

15. A method of driving a display device, the method comprising:

a voltage sensing operation of sensing a voltage applied to a plurality of light emitting diodes included in a pixel;

a defective light emitting diode detection operation of detecting whether a shorted defective light emitting diode exists in the pixel based on the voltage and a reference voltage; and a current compensation value calculation operation of calculating a current compensation value for the pixel and increasing the current compensation value as the voltage decreases, when the defective light emitting diode is detected, wherein the pixel comprises:

a first transistor including a gate electrode connected to a first node, a first electrode connected to first power, and a second electrode connected to a second node;

a first light emitting diode including an anode connected to the second node, and a cathode;

a second light emitting diode including an anode connected to the cathode of the first light emitting diode in series, and a cathode connected to second power;

a second transistor including a gate electrode connected to a first scan line, a first electrode connected to a data line, and a second electrode connected to the first node; and a third transistor including a gate electrode connected to a second scan line, a first electrode connected to the second node, and a second electrode connected to a respective one of the sensing lines, and wherein the voltage sensing operation senses a voltage of the second node.

16. The method according to claim 15, wherein the defective light emitting diode detection operation determines that the defective light emitting diode exists when the voltage of the second node is less than the reference voltage.

17. The method according to claim 16, wherein the current compensation value calculation operation calculates a change amount of the voltage of the second node based on the voltage of the second node and the reference voltage, and increases the current compensation value as the change amount increases.

* * * * *